United States Patent
Zachut et al.

(10) Patent No.: US 11,947,768 B2
(45) Date of Patent: Apr. 2, 2024

(54) MULTI-TOUCH DETECTION

(71) Applicant: Microsoft Technology Licensing, LLC, Redmond, WA (US)

(72) Inventors: Rafi Zachut, Rishon-LeZion (IL); Haim Perski, Hod-HaSharon (IL); Jonathan Moore, Tel-Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/329,084

(22) Filed: May 24, 2021

(65) Prior Publication Data

US 2021/0278917 A1    Sep. 9, 2021

Related U.S. Application Data

(60) Continuation of application No. 15/068,701, filed on Mar. 14, 2016, now Pat. No. 11,016,627, which is a division of application No. 12/432,903, filed on Apr. 30, 2009, now abandoned.

(60) Provisional application No. 61/136,049, filed on Aug. 8, 2008, provisional application No. 61/071,458, filed on Apr. 30, 2008.

(51) Int. Cl.
G06F 3/047 (2006.01)
G06F 3/041 (2006.01)
G06F 3/044 (2006.01)
G06F 3/04883 (2022.01)

(52) U.S. Cl.
CPC ........ *G06F 3/047* (2013.01); *G06F 3/041661* (2019.05); *G06F 3/0446* (2019.05); *G06F 3/04883* (2013.01); *G06F 2203/04104* (2013.01)

(58) Field of Classification Search
CPC .. G06F 3/041661; G06F 3/0446; G06F 3/047; G06F 3/04883; G06F 2203/04104
See application file for complete search history.

(56) References Cited

U.S. PATENT DOCUMENTS

| | | | |
|---|---|---|---|
| 2004/0155871 A1* | 8/2004 | Perski | G06F 3/0442 345/174 |
| 2006/0012581 A1* | 1/2006 | Haim | G06F 3/0446 345/173 |
| 2007/0062852 A1* | 3/2007 | Zachut | A63F 3/00643 209/683 |
| 2008/0023232 A1* | 1/2008 | Morag | G06F 3/0418 178/19.01 |
| 2008/0158167 A1* | 7/2008 | Hotelling | G06F 3/041661 345/173 |

* cited by examiner

*Primary Examiner* — Jeff Piziali
(74) *Attorney, Agent, or Firm* — Barta Jones, PLLC

(57) ABSTRACT

A method for multi-touch detection in a touch input device comprising a grid based sensor, the method comprises sampling outputs from a grid based sensor over a first stage of detection, selecting sensor lines based on the sampled outputs, scanning the selected sensor lines along one axis of the grid based sensor over a second stage of detection, and determining positions of user interaction based on outputs sampled in response to scanning the selected sensor lines during the second stage of detection.

20 Claims, 13 Drawing Sheets

MULTI-TOUCH DETECTION

RELATED APPLICATIONS

This application is a continuation and claims benefit of U.S. patent application Ser. No. 15/068,701 filed on Mar. 14, 2016, which is a divisional of U.S. patent application Ser. No. 12/432,903 filed on Apr. 30, 2009, which claims the benefit of priority under section 35 U.S.C. § 119(e) of U.S. Provisional Application No. 61/071,458 filed on Apr. 30, 2008 and U.S. Provisional Application No. 61/136,049 filed on Aug. 8, 2008, the disclosures of which are incorporated herein by reference in their entireties.

FIELD OF THE INVENTION

The present invention, in some embodiments thereof, relates to multi-touch sensitive computing systems and more particularly, but not exclusively to multi-touch detection methods with grid based sensors.

BACKGROUND OF THE INVENTION

Digitizing system and touch sensitive screens that allow a user to operate a computing device with a finger and/or stylus are known. Typically, a digitizer is integrated with a display screen, e.g. over-laid on the display screen, to correlate user input, e.g. finger touch and/or stylus interaction on the screen with the virtual information portrayed on display screen. Position detection of the fingers and/or stylus detected provides input to the computing device and is interpreted as user commands.

U.S. Pat. No. 6,690,156 entitled "Physical Object Location Apparatus and Method and a Platform using the same" and U.S. Pat. No. 7,292,229 entitled "Transparent Digitizer" both of which are assigned to N-trig Ltd., the contents of both which are incorporated herein by reference, describe a positioning device capable of locating multiple physical objects positioned on a Flat Panel Display (FPD) and a transparent digitizer sensor that can be incorporated into an electronic device, typically over an active display screen of the electronic device. The digitizer sensor includes a matrix of vertical and horizontal conductive lines to sense an electric signal. Typically, the matrix is formed from conductive lines patterned on two transparent foils that are superimposed on each other. Positioning the physical object at a specific location on the digitizer provokes a signal whose position of origin may be detected.

U.S. Pat. No. 7,372,455, entitled "Touch Detection for a Digitizer" assigned to N-Trig Ltd., the contents of which is incorporated herein by reference, describes a digitizing tablet system including a transparent digitizer sensor over-laid on a FPD. The transparent digitizing sensor includes a matrix of vertical and horizontal conductive lines to sense an electric signal. Touching the digitizer in a specific location provokes a signal whose position of origin may be detected. The digitizing tablet system is capable of detecting position of multiple physical objects and fingertip touches using same conductive lines.

U.S. Patent Application Publication No. 20060012581 entitled "Tracking window for a digitizer system" assigned to N-trig Ltd., and which is incorporated herein by reference in its entirety, describes an apparatus for tracking positions of user interactions interacting with a sensing area. The apparatus comprises a plurality of sensing elements spread across the sensing area to sense positions of the user interactions and a controller to dynamically select a subset of the sensing elements to determine positions of the user interactions. The selected subset of sensing elements is updated based on previous detected positions of the user interactions. The controller provides for reducing the number of sensing elements that require sampling to determine positions of the user interactions.

US Patent Application Publication No. 20070062852, entitled "Apparatus for Object Information Detection and Methods of Using Same" assigned to N-Trig Ltd., the contents of which is incorporated herein by reference, describes a digitizer sensor and/or touch screen sensitive to capacitive coupling and objects adapted to create a capacitive coupling with the sensor when a signal is input to the sensor. In some embodiments, the digitizer sensor includes a series of activated electrodes and passive electrodes. An AC signal, e.g. a pulsed AC signal, sequentially activates each of the activated electrodes. In response to each AC signal applied, a signal is transferred, by capacitive coupling, to each of the passive electrodes. The presence of a finger or an object typically alters the signal transferred to some of the passive electrodes. In some exemplary embodiments described in this reference, to speed up report rate, the active electrodes are divided into a number of groups wherein the active electrodes in each group are activated sequentially but the groups work simultaneously. This is accomplished by applying AC signals with non-mutually interfering (orthogonal) frequencies to each of the groups working simultaneously.

SUMMARY OF THE INVENTION

According to an aspect of some embodiments of the present invention there is provided a multi-touch sensitive computing system and method that provides for identifying portions of the multi-touch sensitive sensor that requires scanning to detect multi-touch positions of user interactions. According to some embodiments of the present invention, portions of a sensor affected by user interaction are first identified without scanning conductive lines, e.g. sensor lines, of a grid based sensor and then only those portions and/or lines of the sensor are scanned to determine the positions of the user interactions on the multi-touch sensor.

As used herein scanning comprises independently triggering one or more lines along one axis of a grid based sensor and determining outputs on at least one line crossing the triggered line, in a manner that allows for determining the position on the line at which the interaction takes place. It includes triggering one line at a time along one axis of a grid based sensor and in response determining outputs on at least one crossing line. Typically, scanning refers to sequentially triggering one line at a time along one axis of a grid based sensor and in response to each triggering determining outputs on lines (or at least one line) crossing the triggered line. Optionally scanning includes sequentially triggering groups of lines and in response to each triggered group, determining outputs on at least one line crossing the triggered line. When triggering groups of lines, distinctive triggering signals are applied to trigger each line in a single group and the outputs are decomposed to components corresponding to each of distinctive triggering signal.

According to some embodiments of the present invention, portions of a sensor affected by user interaction are identified by simultaneously triggering a plurality of sensor lines of the multi-touch sensor with signals that are either the same or do not allow for the determination of the junction at which the interaction takes place, and analyzing outputs in response to the simultaneous triggering.

As used herein multi-touch sensitive computing systems (sometimes referred to as multi-point sensitive computing systems) refers to systems having a touch sensitive sensor, and capable of detecting input obtained with at least two same user interactions, e.g. finger touch interaction, concurrently interacting with sensor, e.g. at two different locations on the sensor. Multi-point and/or multi-touch detection may include detection of interaction with the digitizer sensor by touch and/or hovering.

An aspect of some embodiments of the present invention provides for a method for multi-touch detection in a touch input device comprising a grid based sensor, the method comprising: sampling outputs from a grid based sensor over a first stage of detection; selecting sensor lines based on the sampled outputs; scanning the selected sensor lines along one axis of the grid based sensor over a second stage of detection; and determining positions of user interaction based on outputs sampled in response to scanning the selected sensor lines during the second stage of detection.

Optionally, the detection during the first and second stage of detection is capacitive based detection.

Optionally, the sensor lines are selected during the first stage of detection in response to determining a presence of user interaction on the sensor lines based on the sampled outputs.

Optionally, the first and second stage of detection is performed over a single refresh cycle of the touch input device.

Optionally, the first stage of detection is shorter in duration than the second stage of detection.

Optionally, the method comprises selecting one of the first or second axes of the grid based sensor for scanning during the second stage of detection, wherein the selection is based on the number of sensor lines selected on each axis.

Optionally, the sampling during the first stage of detection is in response to simultaneous triggering or interrogating a plurality of sensor lines.

Optionally, the sampling during the first stage of detection is in response to simultaneously triggering all sensor lines along one axis of the grid based sensor.

Optionally, the sampling during the first stage of detection is in response to simultaneously triggering all sensor lines in both axis of the grid based sensor.

Optionally, the sampling during the first stage of detection is in response to simultaneously triggering a first group of sensor lines along a first axis with a first triggering signal and a second group of sensor lines along the first axis with a second triggering signal, wherein the second triggering signal is orthogonal to the first triggering signal.

Optionally, the sampling during the first stage of detection is in response to triggering a plurality of lines along a first axis of the grid based sensor and sampling signals on the second axis of the grid based sensor.

Optionally, the outputs of the sensor lines are sampled simultaneously.

Optionally, the selecting during the first stage of detection is in response to sampling a difference signal between outputs of parallel lines in the grid based sensor.

Optionally, the selecting is in response to detecting a magnitude of an output that is below a threshold value.

Optionally, the threshold is determined in accordance with a baseline level determined in the absence of finger touch.

Optionally, the selecting comprises selecting sensor lines along both axes of the grid based sensor.

Optionally, the method comprises selecting sensor lines neighboring the identified lines and including the selected lines as part of the identified lines triggered during the second stage of detection.

Optionally, the method comprises choosing a pre-determined number of sensor lines from the selected lines and triggering only the pre-determined number of selected sensor lines chosen during the second stage of detection.

Optionally, the selected sensor lines associated with a most pronounced detection signal from all the selected sensor lines are chosen.

Optionally, the method comprises transmitting the coordinates to a host associated with the touch input device.

Optionally, the outputs indicating a presence of user interaction is in response to at least one of touch and hovering of the user interaction.

Optionally, the user interaction is a fingertip.

An aspect of some embodiments of the present invention provides for a method for multi-touch detection in a touch input device comprising a grid based sensor, the method comprising: identifying, over a first detection stage, sensor lines associated with outputs indicating a presence of user interaction; and scanning, over a second subsequent detection stage, the identified sensor lines along a first axis of the grid based sensor to determine one or more positions of the user interactions on the sensor lines identified, wherein the first and second detection stages are performed over a single refresh cycle of the touch input device.

An aspect of some embodiments of the present invention provides for a method for multi-touch detection in a touch input device comprising a grid based sensor, the method comprising: performing a first touch detection during a first detection stage, wherein the first touch detection provides for identifying sensor lines on both axes of the grid based sensor affected by user interaction with the sensor; determining if coordinates of the user interactions are ambiguous based on the first touch detection during the first detection stage; and performing a second touch detection that provides for determining junctions affected by user interaction during a subsequent detection stage during a same refresh cycle in response to determined ambiguity, to resolve the ambiguity.

Optionally, the first and second touch detection is a capacitive based detection.

Optionally, the first and second detection stage is performed over a single refresh cycle of the touch input device.

Optionally, the method comprises skipping the second stage of detection during at least one refresh cycle in response to no sensor lines identified during the first detection stage of the cycle.

Optionally, the method comprises skipping the second stage of detection during at least one refresh cycle in response to only identifying sensor lines associated with a single interaction location during the first stage of detection of the cycle.

Optionally, the method comprises skipping the second stage of detection of at least one refresh cycle in response to identifying sensor lines during the refresh cycle that is substantially similar to the sensor lines identified during refresh cycle directly preceding the current refresh cycle.

Optionally, the method comprises determining coordinates of user interactions based on tracking information from previous refresh cycles.

Optionally, different detection methods are used for the different stages of detection.

Optionally, during the first stage of detection, the sensor lines are identified based on a one-dimensional detection method for detecting user interaction.

Optionally, during the first stage of detection, the sensor lines are identified based on a single touch detection method.

Optionally, during the second stage of detection, determining coordinates of user interaction is based on a two-dimensional detection method for detecting user interaction.

Optionally, during the second stage of detection, determining coordinates of user interactions is based on a multi-touch detection method.

An aspect of some embodiments of the present invention provides for a method for touch detection in a touch input device comprising a grid based sensor, the method comprising: simultaneously triggering a plurality of sensor lines along a first axis of a grid based sensor with a same triggering signal; sampling capacitively coupled signals on the second axis of the grid based sensor in response to the triggering; simultaneously triggering a plurality of sensor lines along the second axis of the grid based sensor with a same triggering signal; sampling capacitively coupled signals on the first axis in response to the sampling; and determining sensor lines on the first and second axis that have output that indicate a presence of a user interaction.

Optionally, the capacitively coupled signals are sampled substantially simultaneously.

Optionally, the method comprises simultaneously triggering a first group of sensor lines with a first triggering signal and a second group of sensor lines with a second triggering signal, wherein the second triggering signal is orthogonal to the first triggering signal.

Optionally, the first and second triggering signals are orthogonal in phase.

Optionally, the first and second triggering signals are orthogonal in frequency.

Optionally, them method comprises simultaneously triggering a first group of sensor lines along an axis and subsequently triggering a second group of sensor lines along the axis.

Optionally, determining sensor lines on the first and second axis that have output that indicate a presence of a user interaction is in response to detecting a magnitude of an output that is below a threshold value.

Optionally, the threshold is determined in accordance with a baseline level determined in the absence of finger touch.

An aspect of some embodiments of the present invention provides for a method of multi-touch detection in a touch input device comprising: identifying regions in which may have interactions in a first detection stage; scanning only the identified regions in a second detection stage to localize the position of the interactions, wherein the first and second stage are performed during a single refresh cycle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 8A:
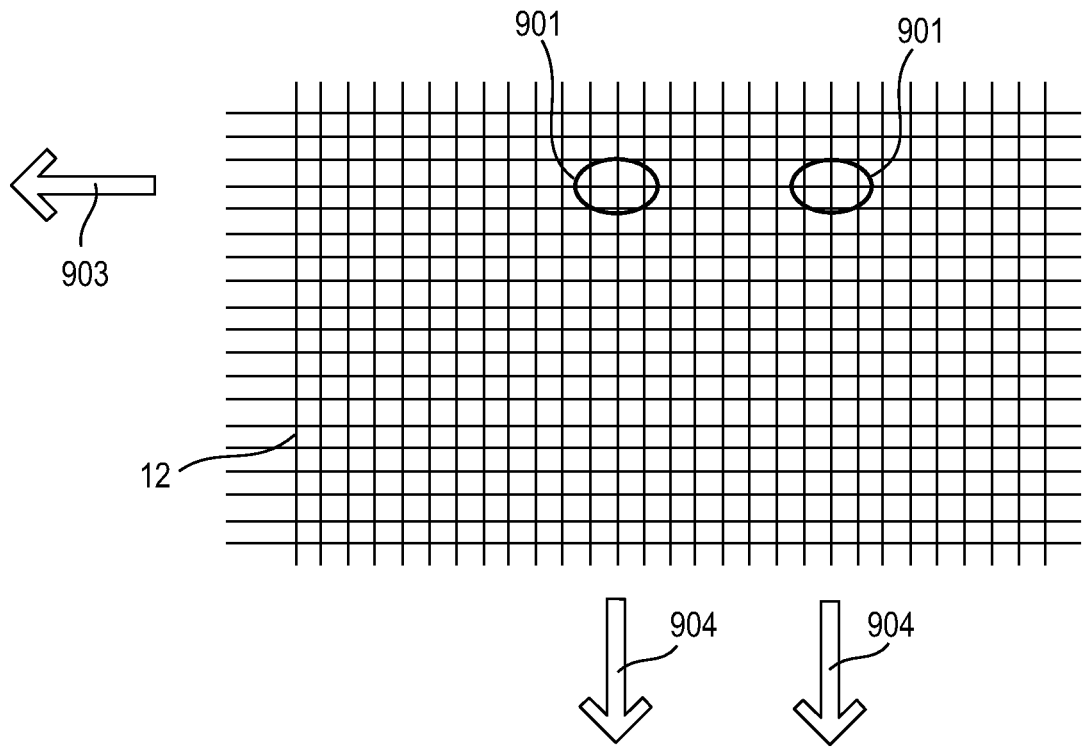
Figure 8B:
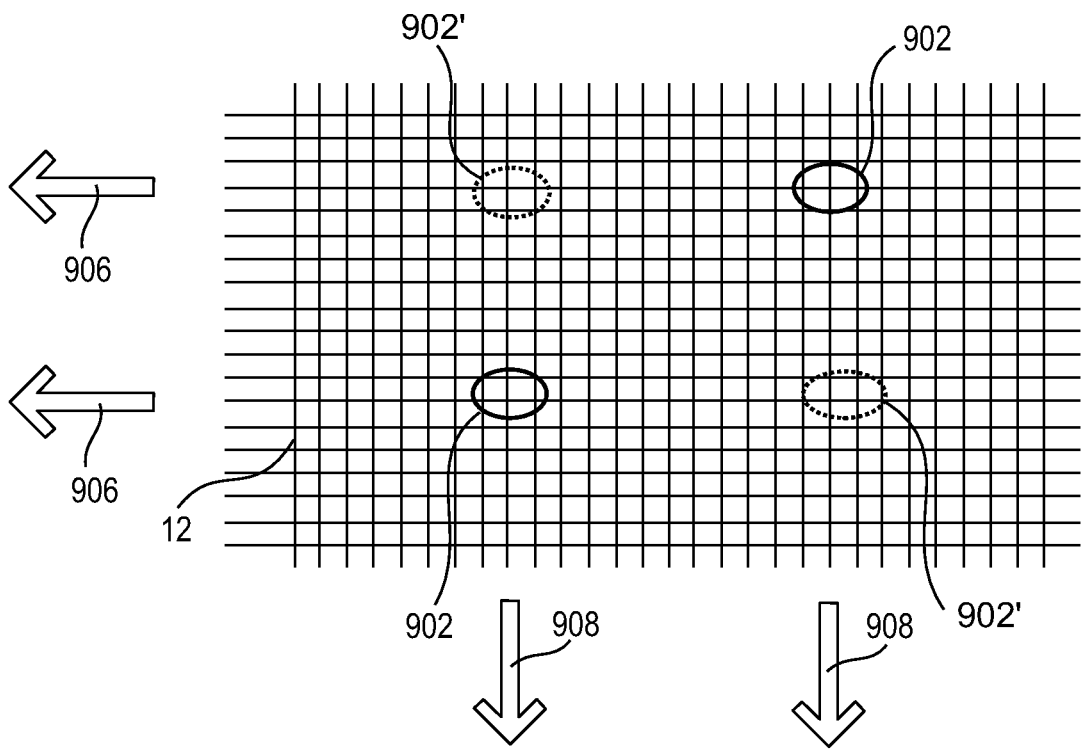
Figure 9:
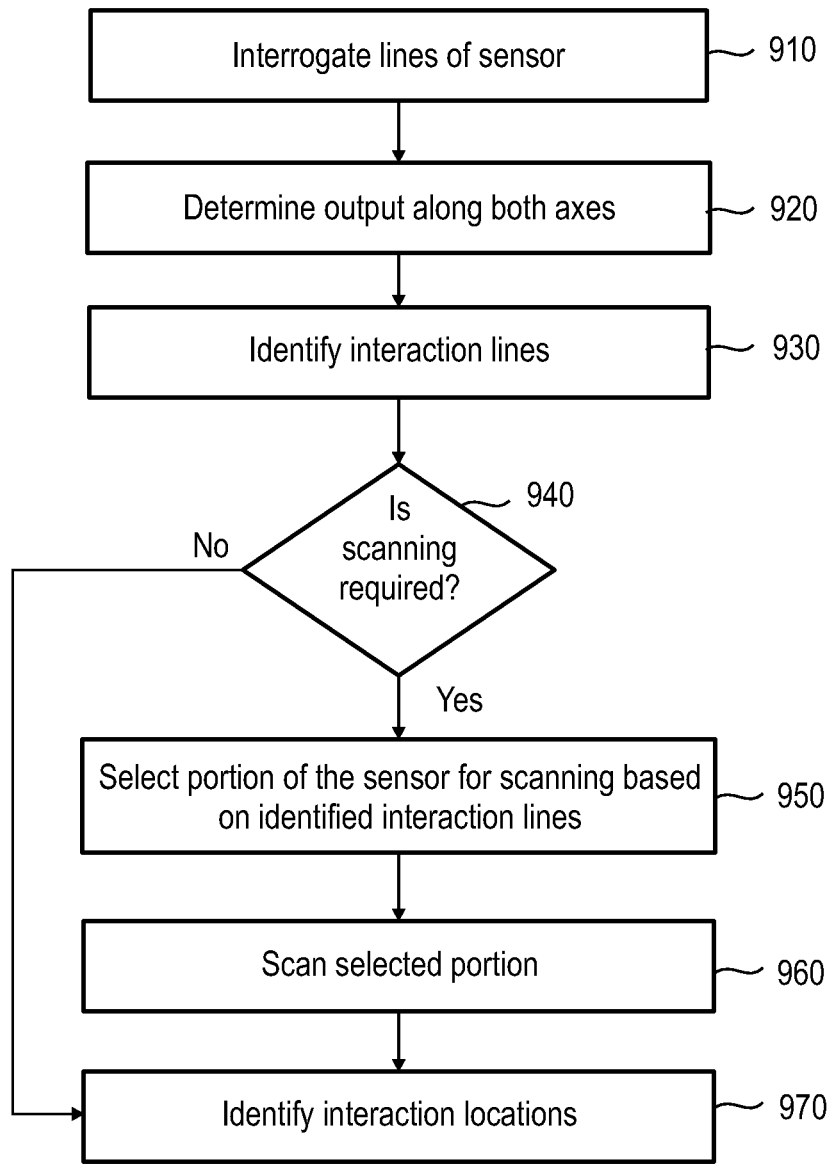

FIGS. 8A-8B are two schematic illustrations showing exemplary output from a digitizer sensor based on differential signal outputs while two fingers are concurrently interacting with the sensor in accordance with some embodiments of the present invention; and FIG. 9 is a simplified flow chart describing an exemplary method for identifying and scanning selected portions of a digitizer sensor based on signal outputs obtained for both axes simultaneously to determine multi-touch interaction in accordance with some embodiments of the present invention.

DESCRIPTION OF SPECIFIC EMBODIMENTS
OF THE INVENTION

The present invention, in some embodiments thereof, relates to multi-touch sensitive computing systems and more particularly, but not exclusively to multi-touch detection methods with grid based sensors.

Known methods for multi-touch detection typically require scanning sensor lines in a grid based sensor to detect a user interaction on one or more junctions of the grid. Typically, scanning involves sequentially triggering sensor lines along one axis of the grid and in response to each triggering, sampling output from all the sensor lines on the other axis of the grid (the cross axis) to determine output from each junction formed by the triggered line and each line crossing it. Typically, sampling output from all the sensor lines is performed substantially simultaneously. Scanning the lines to determine output at each junction of the grid provides for differentiating between more than one simultaneous touch detected on a single sensor line.

The present inventors have found that the processing and time requirements to repeatedly sample all cross lines for each line triggered is significant and may limit one or more of the report rate that can be achieved, the size of the sensor that can be used and the resolution of the sensor.

The present inventors have also found that the report rate, size and/or resolution of the sensor can be increased by first determining possible areas of interactions without scanning and then scanning only portions of the sensor where interaction (touch or hovering) activity is identified to determine the location of the interaction within these portions.

An aspect of some embodiments of the present inventions provides for performing touch detection in two stages. During a first stage of detection, interacting portions one or more interaction areas of the sensor are identified and during a second stage, the identified portions are scanned. As used herein interaction areas are areas where possible interaction has been detected and interacting lines are lines on which interaction has been identified. According to some embodiments of the present, performing touch detection in two stages provides for limiting the area(s), e.g. the number of sensor lines of the sensor that requires scanning and thereby reducing the over all time required for detection. According to some embodiments of the present invention, limiting the number of sensor lines of the sensor that requires scanning to determine interaction positions reduces the overall system sensitivity to noise since the detection is performed on only a limited portion of the junctions available on the sensor. As such the number of false positives in response to scanning is reduced.

According to some embodiments of the present invention, to identify interacting portions of the sensors, all sensor lines along one axis are simultaneously triggered and output from all lines along the second axis (the cross-lines) are sampled. In some exemplary embodiments, all lines are triggered with a same signal. In some exemplary embodiments, to increase the sensitivity of measurement the number of lines simultaneously triggered with the same triggering signal during a first stage of detection is limited. Optionally, groups of lines are triggered with different frequencies. Optionally, groups of lines are triggered with signals having an orthogonal phase. The present inventors have found that triggering groups of lines with different frequencies, signals with orthogonal phase and/or triggering less than all the sensor lines along one axis provides for increasing sensitivity of outputs from the cross lines.

Alternatively, only a portion of all the lines along one axis, e.g. half the lines, one third of the lines or one forth of the lines, are simultaneously triggered and other portions are subsequently triggered. Although sequential triggering by groups increases the time required to identify interacting sensor lines, it is still more time affective than triggering each line separately as is typically done during the second stage of detection and it has been found in significantly increase sensitivity of measurement.

Typically, finger touch reduces the signal baseline output level on the sampled lines. The baseline output level refers to the output signal measured in the absence of finger touch. The present inventors have found that when a plurality of lines are triggered simultaneously, the affect that one finger has on the baseline output level is less pronounced than its affect when only a single line is triggered at a time. In some exemplary embodiments, triggering groups of lines with different frequencies and/or at different phases and/or splitting to the sensor lines into a number of groups that work sequentially provides for increasing the affect of the finger on a particular aspect of the signal crossing on the cross line. Typically, the threshold used for identifying activity on a line is higher than the threshold used during scanning to detect user interaction at a particular junction.

According to some embodiments of the present invention, during the first stage of detection, sensor lines along a first axis are triggered and interacting lines along the second axis of the sensor are identified. Subsequently, during the second stage of detection, the identified interacting lines along the second axis are scanned and in response to each triggering event of the scan, all lines along the first axis are sampled.

According to some embodiments of the present invention, the first stage of detection is divided into a first and second sub-stage of detection. In some exemplary embodiments, during the first sub-stage interacting lines along the second axis of the sensor are identified based on triggering along the first axis. Subsequently, during the second sub-stage interacting lines along the first axis are identified based on triggering along the second axis. According to some embodiments, in response to identifying interaction lines on both axes, one of the first axis or second axis is selected as the triggering axis and the other is selected as the sampling axis. In some exemplary embodiments, during the second stage of detection, only interacting lines on the sampling axis are sampled (as opposed to all the lines). The present inventors have found that by sampling (or referring) only the identified interacting lines, processing requirements can be further reduced. In addition, the present inventors have found that sampling only the interacting lines, provides for further reducing the number of false positives detected as compared to scanning the all lines on the scan axis, e.g. no false positives will be detected on lines that are defined as non-interacting lines. In some exemplary embodiments, in response to scanning and sampling only the interaction lines, only 5% of the junctions available on the grid based sensor are queried during the second stage of detection. In such a case, the systems sensitivity to noise is greatly reduced. In some exemplary embodiments, the axis including the least number of interacting lines is selected as the scanning axis.

According to some embodiments of the present invention, during a first stage of detection all sensor lines from both axis are simultaneously triggered and output from the lines are simultaneously detected and used to determined possible interacting portions of the sensor. Known single touch detection methods typically provide for simultaneously triggering all lines and in some exemplary embodiments can be implanted during the first stage of detection to identify interacting lines in the first stage of detection. In some exemplary embodiments, differential signals are obtained from outputs of differential amplifiers connected to pairs of non-adjacent parallel sensor lines to identify interaction one the sensor lines. According to some embodiments of the present invention, during the second stage of detection, known multi-touch detection methods are implemented to determine the positions of the interaction along the interaction lines identified.

According to some embodiments of the present invention, during every refresh period, an interacting portion is identified during a first stage of detection and position of interaction is determined during a subsequent second stage of detection. In some exemplary embodiments, if no interacting portions have been identified during the first stage of detection, the second stage of detection is not performed. In some exemplary embodiments, if the interacting portions identified during the first stage have not significantly changed from a previous refresh period, the second stage of detection is skipped and the interaction is assumed to be maintained in their previous positions. In some exemplary embodiments, if the positions of the interactions can be identified, e.g. determined without ambiguity during the first stage of detection of a particular refresh period, the second stage of detection is skipped.

Figure 1:
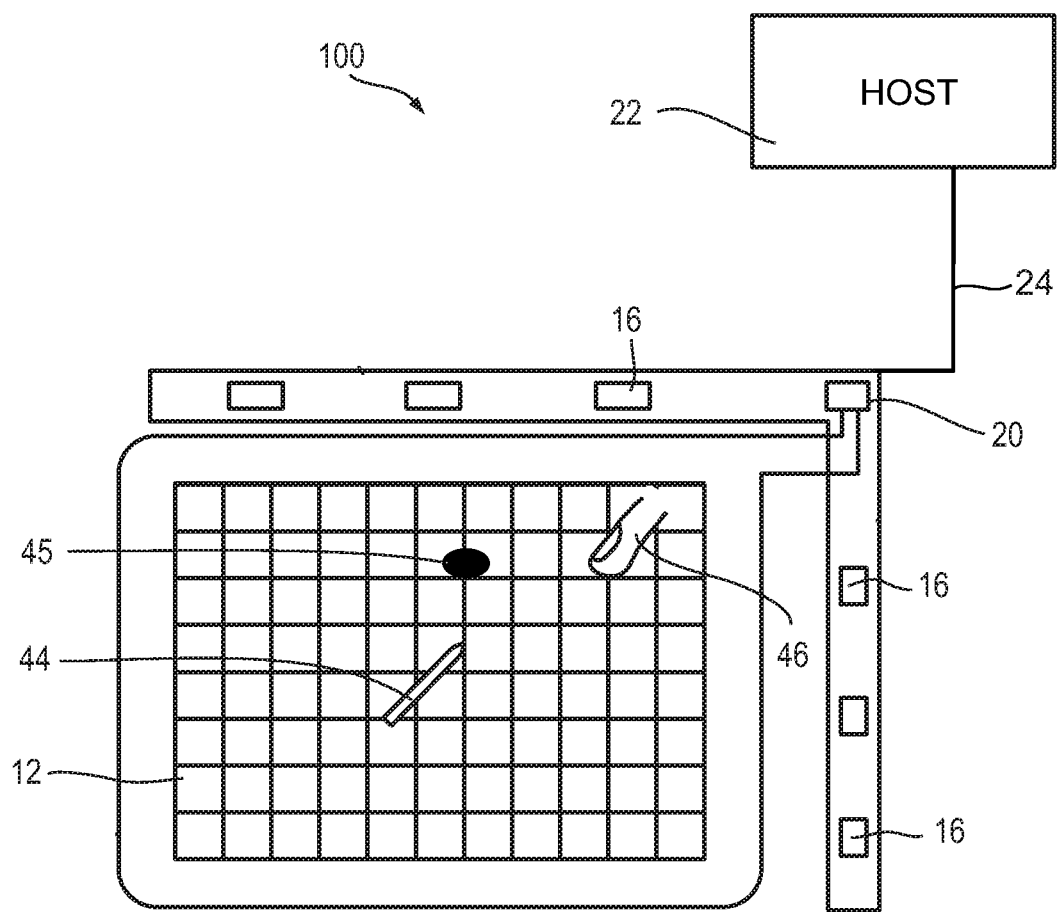
FIG. 1 is an exemplary simplified block diagram of a digitizer system in accordance with some embodiments of the present invention.

Reference is now made to FIG. 1 showing an exemplary simplified block diagram of a digitizer system for use with some embodiments of the present invention. The digitizer system 100 shown in FIG. 1 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system is operative to detect multiple inputs from one or more stylus(es) 44, finger(s) 46 and/or a conductive object(s) 45. According to some embodiments of the present invention, the digitizer system comprises a sensor 12 including a patterned arrangement of conductive lines, which is typically transparent, and which is overlaid on a FPD 10. Typically, sensor 12 is a grid based sensor including horizontal and vertical conductive lines making up the sensor lines. Typically, the parallel sensor lines are spaced at a distance of approximately 2-8 mm, e.g. 4 mm, depending on the size of the FPD and a desired resolution. For example approximately 40-70 lines may span along one axis of a 12 inch screen.

An ASIC 16 comprises circuitry to process and sample the sensor's output into a digital representation. The digital output signal is forwarded to a digital unit 20, e.g. digital ASIC unit, for further digital processing. According to some embodiments of the present invention, digital unit 20 together with ASIC 16 serves as the controller of the digitizer system and/or has functionality of a controller and/or processor. According to some embodiments of the present invention, ASICs 16 and digital unit 20 operate as a detection unit for processing and sampling the sensor's output. The outcome, e.g. calculated position, once determined, is forwarded to a host 22 via an interface 24 for processing by the operating system or any current application. Typically, ASIC 16 is connected to outputs of the various sensor lines in the grid and functions to process the received signals at a first processing stage. ASIC 16 typically includes one or more arrays of amplifiers, e.g. an array of differential amplifiers, an array of single ended amplifiers, or an array of differential amplifier optionally including one grounded input to amplify the sensor's signals. In some exemplary embodiments, the grounding input is dynamically selected by ASIC 16.

According to some embodiments of the invention, digital unit 20 receives the sampled data from ASIC 16, reads the sampled data, processes it and determines and/or tracks the position of physical objects, such as stylus, and/or finger, touching the digitizer sensor. According to some embodiments of the present invention hovering of an object, e.g. stylus, finger and hand, is also detected and processed by digital unit 20.

According to some embodiments of the present invention, digital unit 20 is operative to provide a command signal to ASIC 16 to switch between a plurality of available circuit paths (two or more) to connect to outputs of the various sensor lines in the grid. In some exemplary embodiments, digital unit 20 together with ASIC 16 provides for alternately connecting outputs of the various conductors to one of an array of differential amplifiers and an array of single ended amplifiers (or differential amplifiers with one grounded input). According to some embodiments of the present invention, digital unit 20 is operative to control triggering of one or more sensor lines. According to some embodiments of the present invention, ASIC 16 together with digital unit 20 provides for triggering various conductors with an oscillating signal having one or more selected pre-defined frequencies.

Figure 2:
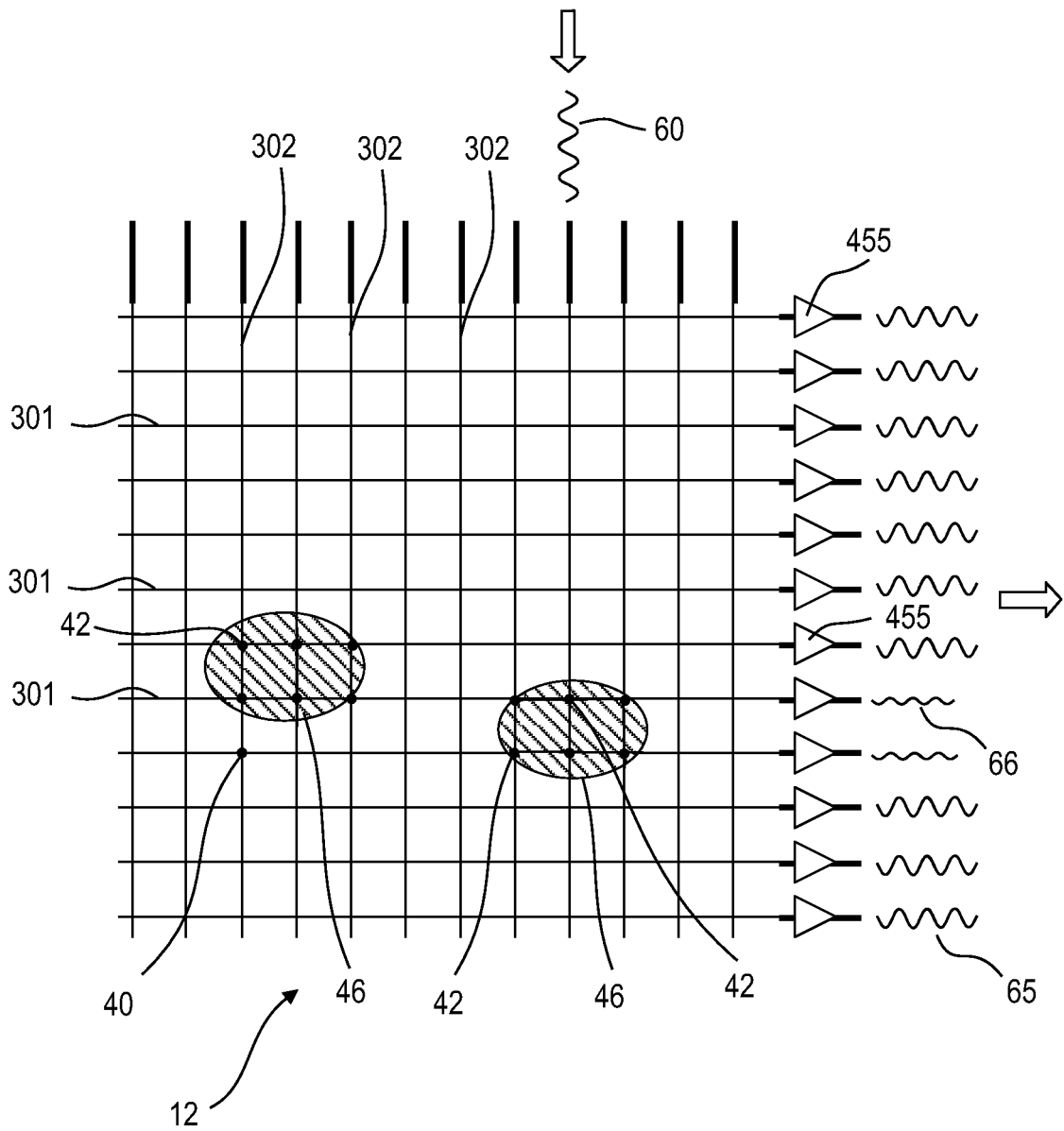
FIG. 2 is an exemplary simplified circuit diagram for touch detection based on triggering sensor lines along a first axis of a digitizer sensor and detecting output signals crossing to sensor lines along a second axes of the sensor by virtue of a capacitance formed at junctions in the sensor grid in accordance with some embodiments of the present invention.

Interacting Lines Identified Based Analysis of Signals Crossing by Virtue of Capacitance at Junctions Between Cross-Lines Reference is now made to FIG. 2 showing an exemplary simplified circuit diagram for touch detection based on triggering sensor lines along a first axis of a digitizer sensor and detecting output signals crossing to sensor lines along a second axis of the sensor by virtue of a capacitance formed at junctions in the sensor grid in accordance with some embodiments of the present invention. According to some embodiments of the present invention, grid based sensor 12 provides for capacitive-based detection. At each junction, e.g. junction 40 in sensor 12 a certain residual amount of capacitance exists between orthogonal sensor lines 301 and 302. When a sensor line, e.g. one of sensor lines 302 is triggered with a signal 60, the signal passes to cross lines 301 by virtue of the residual capacitance formed at junctions 40. Typically, the signal on the cross line, e.g. cross line 301 is referred to as the coupled signal. In some exemplary embodiments, lines 301 are input to single ended amplifiers 455 and output from the amplifiers are sampled. Optionally, lines 30 are input to a differential amplifier where one of the inputs to the amplifier is grounded. Typically, each of the sensor lines on the triggering axis is triggered in sequence and outputs from all cross-lines are sampled. Different interaction areas may be identified as different lines are triggered. The sequential scanning and repetitive sampling of the cross lines provides of obtaining a two dimensional map interaction with sensor 12. Although, sensor lines 302 are shown as the triggered lines and sensor lines 301 are shown as the output lines, optionally sensor lines 301 can be triggered and output from lines 302 can be sampled. Typically, triggering signal 60 is an AC signal.

In some known multi-touch detection systems, the procedure for detection includes triggering each sensor line along one axis of the sensor, e.g. each active line 302, one line at a time, and during each triggering, sampling signals, e.g. simultaneously in all lines crossing that triggered line, e.g. all lines of the orthogonal axis (passive lines 301). This triggering and detecting procedure is repeated until all the lines in the axis used for triggering have been scanned and interaction in all junction points has been detected.

Such a multi-touch detection method typically provides for constructing two dimensional maps that indicate positions and/or locations of a plurality of fingers (and other conductive objects) concurrently interacting with sensor 12. Typically, such a map indicates on which junction an interaction, e.g. a touch is present. In some embodiments the signals are processed and/or interpolated to provide sub-junction resolution.

When a finger 46 touches (or hovers over) the sensor, the capacitance formed in junctions 42 within the vicinity of finger 46 typically changes since the finger typically drains current from the lines to ground. Typically, the presence of a finger decreases the amplitude of the coupled signal by 5-15% or 15-30% so that output 66 signifying a presence of a finger and can be differentiated with output 65 which signifies that no finger is present.

Some known multi-touch detection methods provide for simultaneously triggering more than one line with different frequencies as is described in more detail in incorporated U.S. Patent Publication No. 20070062852. In some embodiments described in incorporated U.S. Publication 20070062852 simultaneously triggering more than one line with different frequencies provides for increasing the report rate for scanning. It is understood that utilizing this method, while obviously faster than scanning each line separately, does require more hardware.

Other known combined single touch and multi-touch detection systems and methods provide for multi-touch detection in specified pre-defined areas of sensor 12 and only the active line and passive lines crossing the pre-defined areas are triggered and sampled. This methodology is described in U.S. patent application Ser. No. 12/417,062 assigned to N-Trig Ltd., the contents of which is incorporated herein by reference.

The present invention is not limited to the technical description of the digitizer system described herein. The present invention may also be applicable to other digitized sensor and touch screens known in the art, depending on their construction. The present invention may also be applicable to other touch detection methods known in the art. Multi-touch detection is described with further details, for example in incorporated U.S. Pat. No. 7,372,455 and US Patent Publication No. 20070062852. The present invention is not limited to the multi-touch detection system and method described herein. The present invention may also be applicable to other multi-touch detection methods and sensors depending on their construction. In general, multi-touch detection methods of whatever types are either more complex or slower than corresponding single touch detection methods.

Figure 3A:
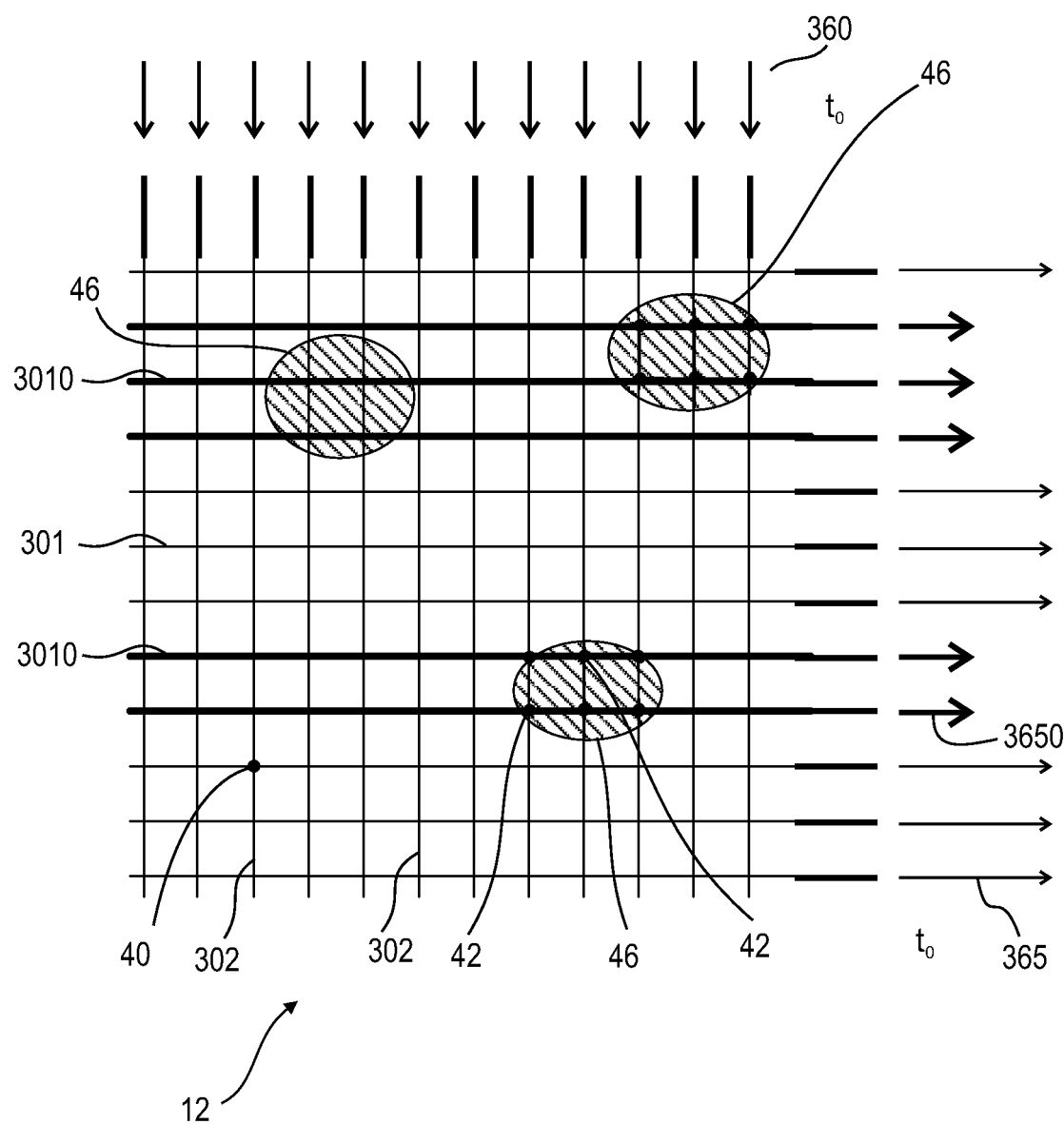
FIG. 3A is a schematic illustration of digitizer sensor outputs along a second axis of a digitizer sensor in response to simultaneously triggering sensor lines along a first axis used to identify interacting lines of the sensor along the second axis in accordance with some embodiments of the present invention.
Figure 3B:
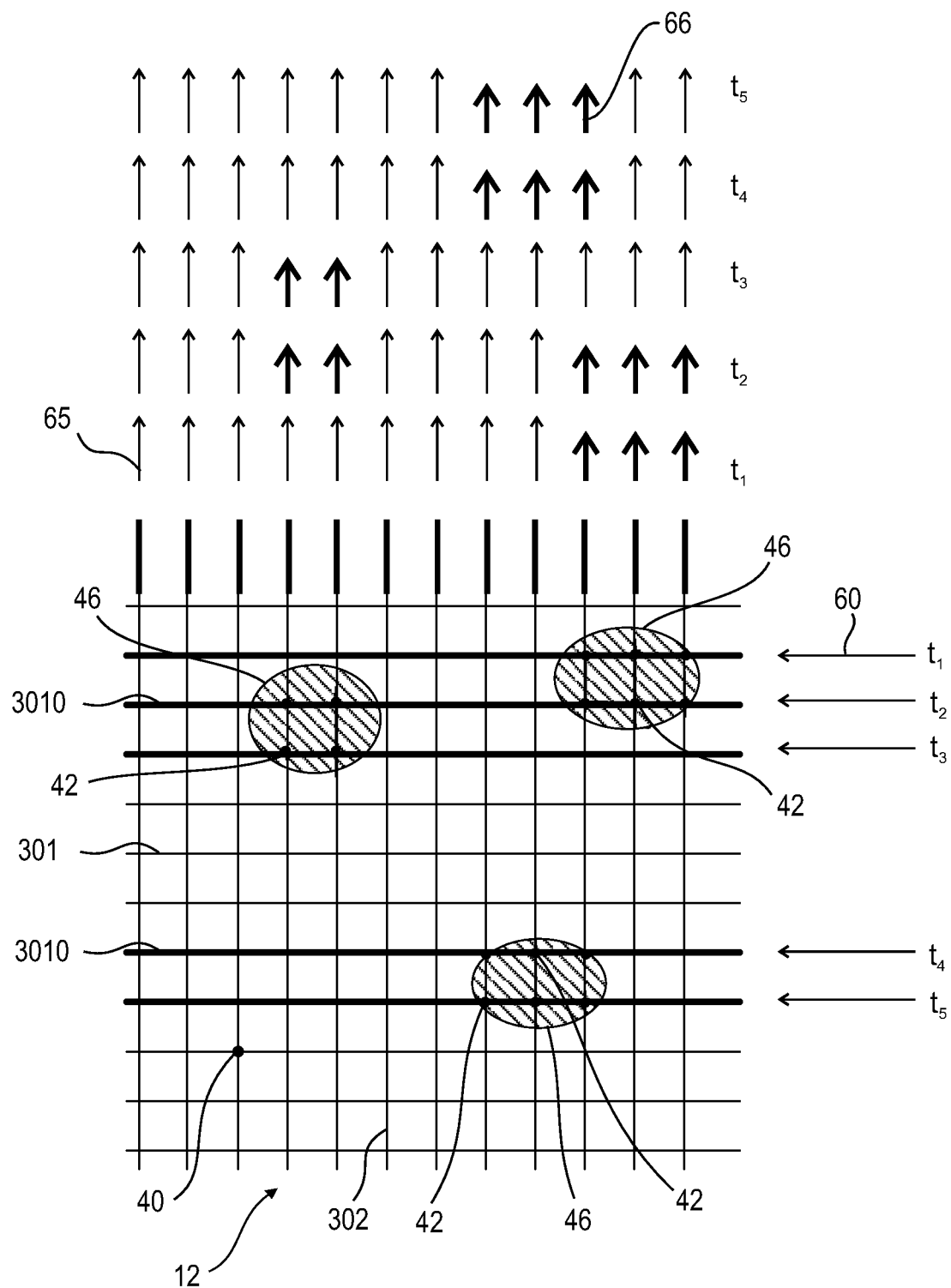
FIG. 3B is a schematic illustration of sensor outputs when scanning interacting lines of the second axis of the sensor to determine multi-touch interaction in accordance with some embodiments of the present invention.
Figure 4:
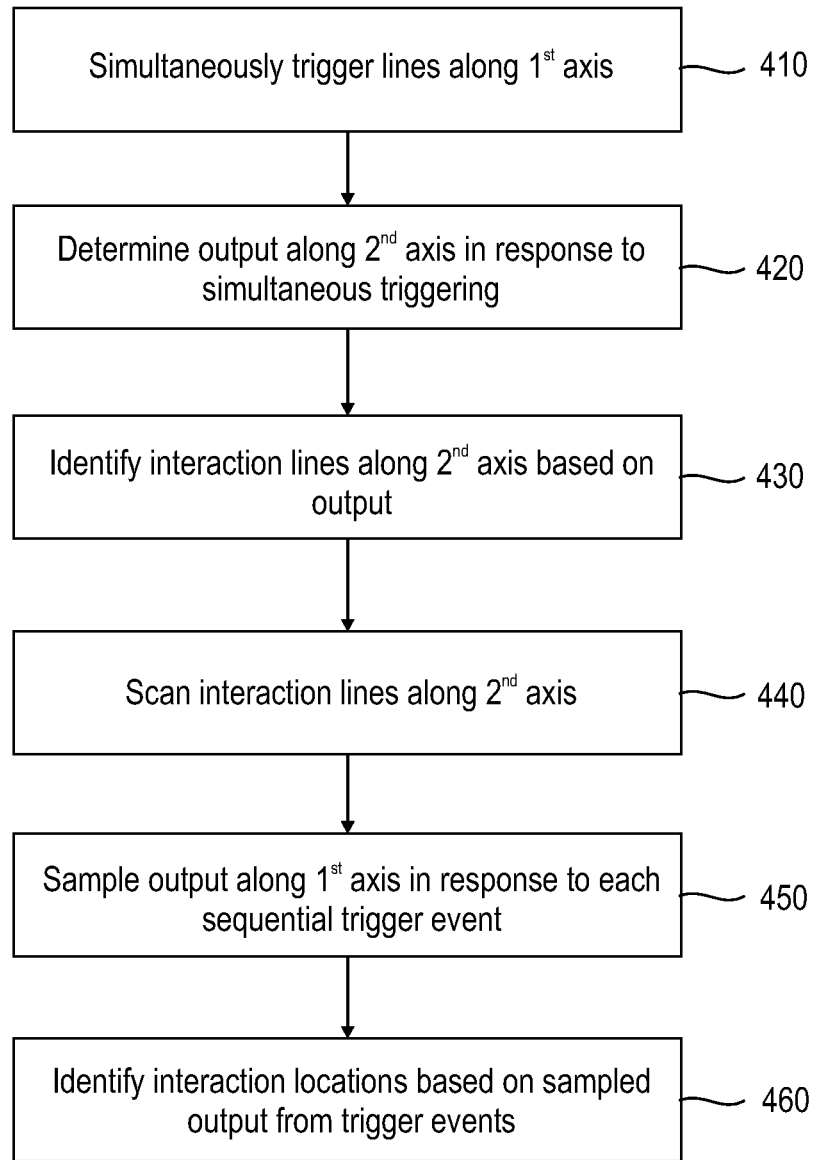
FIG. 4 is a simplified flow chart of an exemplary method for identifying and scanning interacting lines of a digitizer sensor along one axis of the sensor to determine multi-touch interaction in accordance with some embodiments of the present invention.

Reference is now made to FIG. 3A which is a schematic illustration of digitizer sensor outputs along a second axis of a digitizer sensor in response to simultaneously triggering sensor lines along a first axis. Reference is also made to FIG. 4 showing a simplified flow chart of an exemplary method for identifying and scanning interacting lines of a digitizer sensor along one axis of the sensor to determine multi-touch interaction. Both FIG. 3A and FIG. 4 describe some embodiments of the present invention. It is noted that sensor 12 shown in FIG. 3A and in the following FIGS. 3B, 5A, 5B, 5C, 7A, 8A and 8B is a blown up version of a portion of a typical digitizer sensor. Typically, the number of lines along the X and Y axes range between approximately 40-70 lines for a 12 inch screen. In some exemplary embodiments, more than 70 lines per axis are used.

According to some embodiments of the present invention, during a first stage of detection, rather than scanning all of sensor 12 to determine touch locations 46, interacting lines, e.g. interacting lines 3010 along one axis of the sensor 12 are identified and only the identified interacting lines are selected for scanning. Interacting lines are sensor lines of sensor 12 that are affected by user interaction, e.g. sensor lines crossing touch locations 46. Scanning interacting lines provide for reducing the time period and processing involved in determining touch locations 46. In response to reduced time and processing, an update rate of the touch sensitive screen and/or digitizer associated with sensor 12 can be increased.

According to some embodiments of the present invention, to identify interacting lines 3010 prior to scanning, a group of sensor lines 302, e.g. all sensor lines 302 are triggered simultaneously with an AC triggering signal 360 (block 410). Optionally, sensor lines 302 are divided into groups and lines from each group are triggered simultaneously with indistinguishable (or same) signals. In response to the simultaneous triggering, outputs from cross lines 301 are sampled (block 420) and amplitudes of the output signals are examined to identify interacting lines 3010 among cross lines 301 (block 430). According to some embodiments of the present invention, a threshold on signal amplitude is defined and sensor lines 301 having signal amplitudes 3650 below the defined threshold are identified as interacting lines 3010 while sensor lines 301 having signal amplitudes 365 above the defined threshold are labeled as non-interacting lines. Stated differently, lines that differ from a baseline value by less than a difference threshold (typically below the threshold) are labeled as non-interacting lines and lines that differ from the baseline by more than the difference threshold are labeled as interacting lines. Exemplary methods for defining the threshold to identify the interacting lines will be described in more detail herein below.

According to some embodiments of the present invention, identified interacting lines 3010 along the second axis are scanned (for example, sequentially triggered) to determine locations of touch interaction (block 440). Referring now also to FIG. 3B showing a schematic illustration of sensor outputs when scanning interacting lines of the second axis of the sensor to determine multi-touch interaction in accordance with some embodiments of the present invention. According to some embodiments of the present invention, during a second stage of detection, e.g. the detection stage, the triggering axis is switched and only interacting lines 3010 are sequentially triggered to locate various touch positions 46 (block 440). In response to each triggering event e.g. triggering events at times t1, t2, ... t5, output from all cross-lines 302 are sampled to obtain two-dimensional information regarding the various touch locations 46 and/or touch junctions 42 on interacting lines 3010 (block 450). Typically, detection is based on the amplitude of signal output as described in reference to FIG. 2 describing a known multi-touch detection method (block 460). Typically, signal output 66 from a sensor line 302 having amplitude below a pre-defined threshold for touch detection provides for identifying touch on a junction between a currently triggered line 3010 and the sensor line 302 while signal output associated with an amplitude above the pre-defined threshold is indicates that no touch has been detected. Typically, different thresholds are used for touch detection and for identifying an interacting line since touch detection typically requires a larger difference from the baseline.

According to embodiments of the present invention described in reference to FIGS. 3A, 3B, and 4, the number of lines that require scanning to determine multi-touch positions concurrently interacting with a digitizer sensor is reduced so that only sensor lines identified as interacting lines are scanned. In such embodiments, all cross lines are typically sampled in response to each triggering event to resolve the location(s) of touch along each interacting line. Typically, the cross lines are sampled substantially simultaneously so that the number of cross lines do not typically influence the report rate.

According to some embodiments of the present invention, both the lines that require triggering as well as the lines that require sampling are identified as interaction lines and only the interacting lines on the sampling axis are sampled during the second stage of detection. Although reducing the number of lines sampled during each trigger event doesn't directly increase report rate, it does reduce the amount of processing required to detect touch. In addition, reducing the number of lines sampled during each trigger event provides for reducing the number of false positives that may occur, e.g. on non-interacting lines.

Figure 5A:
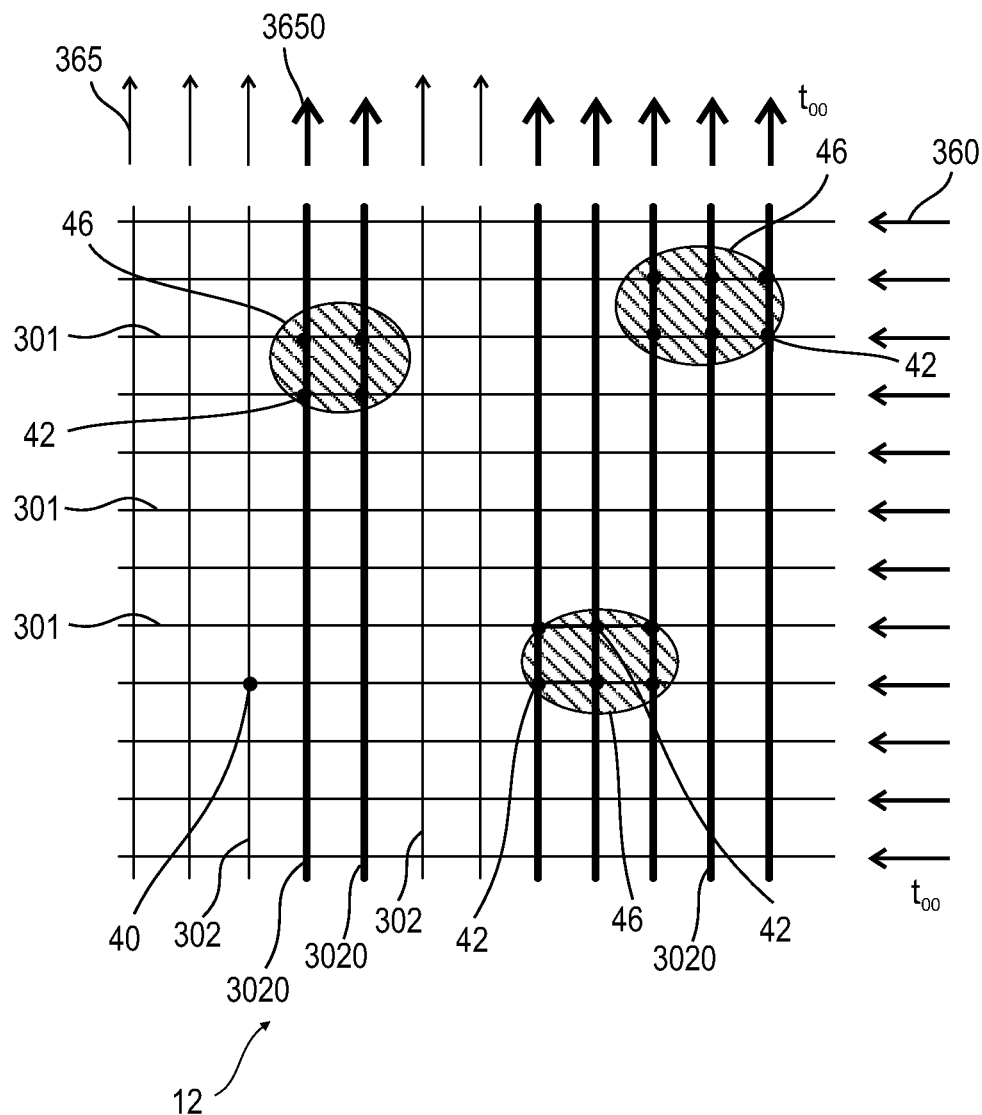
FIG. 5A is a schematic illustration of digitizer sensor outputs along a first axis of a digitizer sensor in response to simultaneously triggering sensor lines along a second axis used to identify interacting lines of the sensor along the first axis in accordance with some embodiments of the present invention.
Figure 6:
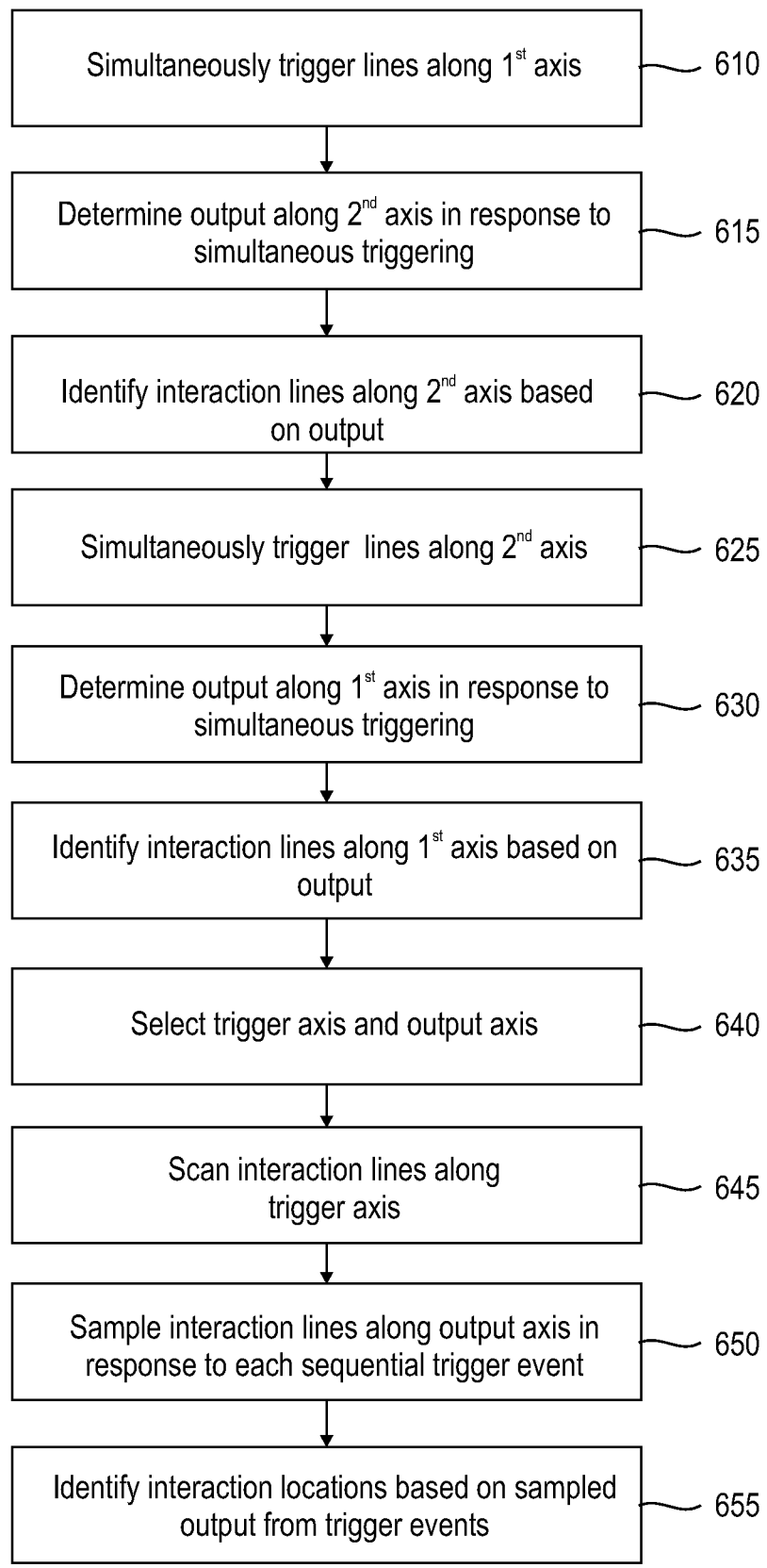
FIG. 6 is a simplified flow chart describing an exemplary method for scanning and sampling selected sensor lines to determine multi-touch interaction in accordance with some embodiments of the present invention.

Reference is now made to FIG. 5A which shows a schematic illustration of outputs along a first axis of a digitizer sensor in response to simultaneously triggering sensor lines and to FIG. 6 which shows a simplified flow chart of an exemplary method for scanning and sampling selected sensor lines to determine multi-touch interaction in accordance with some embodiments of the present invention. According to some embodiments of the present invention, during a first part (a first sub-stage) of the first stage of detection, sensor lines 302 along the first axis are simultaneously triggered (block 610), and corresponding outputs of sensor lines 301 along the 2nd axis are determined, e.g. sampled (block 615). Based on the outputs, interacting lines 3010 along the second axis are identified (block 620). Methods for identifying interaction lines 3010 based on the outputs have been described in reference to FIG. 3A and FIG. 4 herein above.

According to some embodiments of the present invention, during a second part of the first stage, the triggering axis is switched and sensor lines, e.g. sensor lines 301 along the second axis are simultaneously triggered (block 625), e.g. with a signal 360. Optionally, signal 360 a same or similar to signal 360 used during a triggering event t00. In response to the simultaneous triggering, outputs of sensor lines, e.g. sensor lines 302 along the cross axis (the first axis) are sampled (block 630). Typically the sampling of sensor lines 302 along the first axis is performed substantially simultaneously. According to some embodiments of the present invention, interacting lines along the first axis, e.g. lines 3020 are identified based on the output sampled (block 635). Methods for identifying interacting lines 3020 from lines 302 are similar to the methods described in reference to FIGS. 3A and 4 for identifying interacting lines 3010 from lines 301 and are described in more detail herein below.

Optionally, one or more lines on either side of identified interacting lines 3010 and/or 3020 are also defined as interacting lines. The present inventors have found that including neighboring lines may provide an improved estimation of the center of mass of a detected touch position.

Figure 5B:
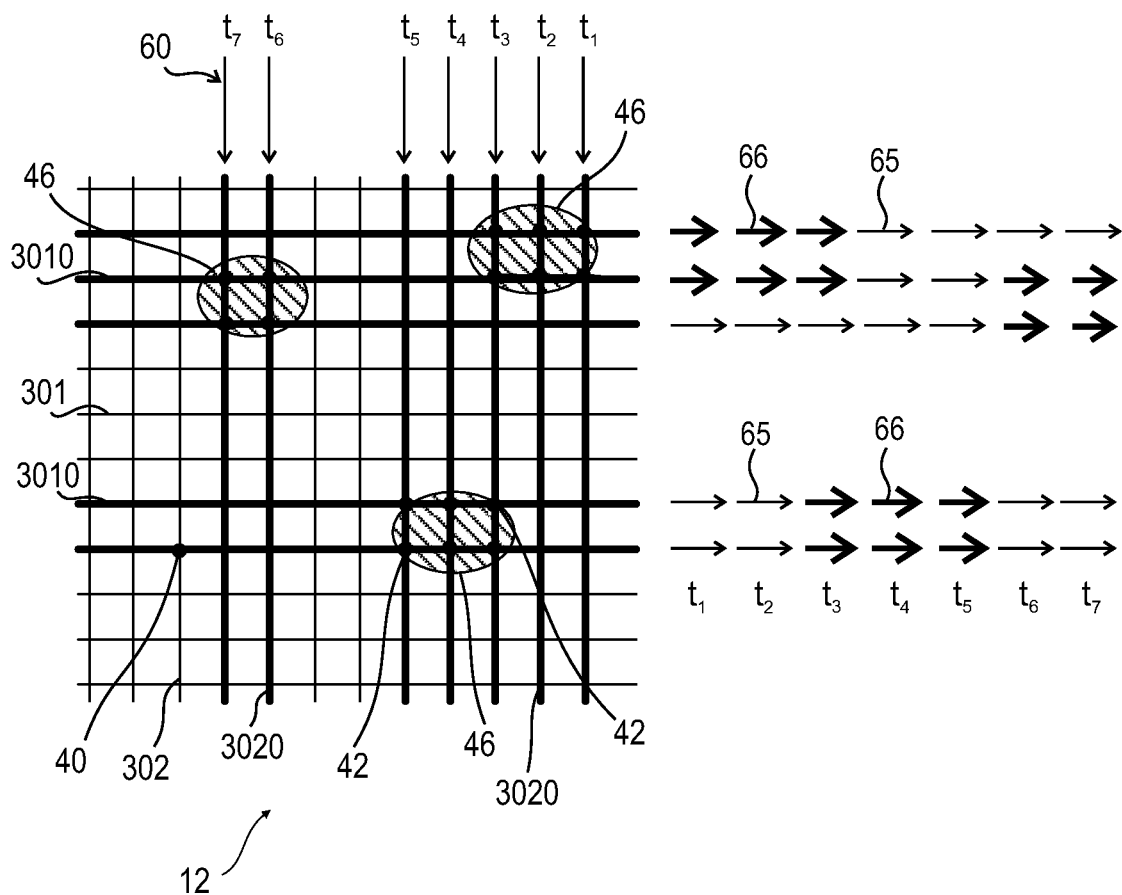
FIG. 5B is a schematic illustration of sensor outputs when scanning interacting lines along the first axis if the sensor and sampling interacting lines along the second axis of the sensor to determine multi-touch interaction in accordance with some embodiments of the present invention.

According to some embodiments of the present invention, one of the first and second axes is selected for triggering while the other is selected for sampling (block 640). Referring now also to FIG. 5B which shows a schematic illustration of sensor outputs when scanning only interacting lines along the first axis of the sensor and sampling only interacting lines along the second axis of the sensor in accordance with some embodiments of the present invention. In the exemplary shown in FIG. 5B when the first axis is defined as the triggering axis, interacting lines 3020 are triggered (block 645) with a signal 60 and outputs from interacting lines 3010 are sampled (block 650). Typically in response to each of the triggering events t1, t2, . . . t7, all interacting lines 3010 are sampled substantially simultaneously to identify positions, e.g. junctions 42 along interacting lines 3010 where touch interaction 46 is present (block 655). Substantially simultaneous sampling of interacting lines 3010 is repeated for each interacting line 3020 identified. According to some embodiments of the present invention, based on the identified junctions 42 showing interaction a touch position and/or a center of mass of the touch position are determined.

Figure 5C:
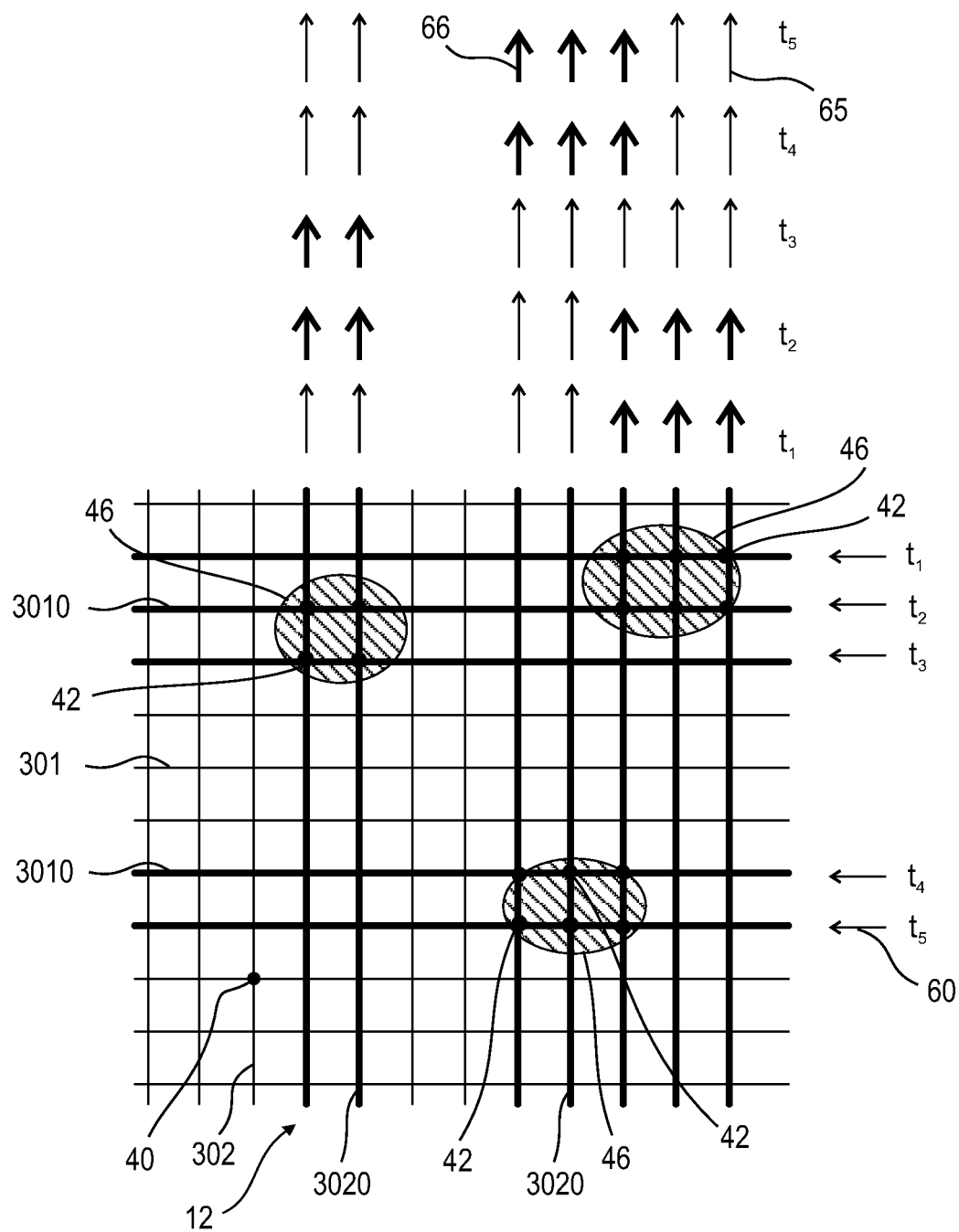
FIG. 5C is a schematic illustration of sensor outputs when scanning interacting lines along the second axis of the sensor and sampling interacting lines along the first axis of the sensor to determine multi-touch interaction in accordance with some embodiments of the present invention.

Alternatively, the second axis can be selected as the scanning axis and the first axis as the output axis. Referring now also to FIG. 5C which shows a schematic illustration of sensor outputs when scanning only interacting lines along the second axis of the sensor and sampling only interacting lines along the first axis of the sensor in accordance with some embodiments of the present invention. For the case shown in FIGS. 5A-5C, the number of interacting lines identified along the first axis is greater than the number lines identified along the second axis. As shown in FIG. 5C, when selecting the second axis as the triggering axis, five triggering events t1, t2, . . . t5 are required for scanning as opposed to the seven triggering events required to scan the first axis as shown in FIG. 5B. The present inventors have found that by selecting the axis with the least number of interacting lines for scanning the scan time can be reduced and thus the report rate can be increased. In accordance with some embodiments of the present invention, the scan axis and the output axis are selected based on the number of interacting lines identified on each axis.

Typically, 2-3 sensor lines along each axis is affected by each finger touch, so that two fingers concurrently interacting with the sensor may affect between 2-6 lines along each axis, three fingers concurrently interacting with the sensor may affect between 2-9 lines along each axis (depending on the number of common sensor lines). In some exemplary embodiments, a pre-defined number indicating the maximum of lines that can be scanned (and/or sampled) is defined, e.g. 10 lines on each axis, or 10 lines on one axis and 12 lines on the other axis. In some exemplary embodiments, defining the maximum number of interacting lines that can be identified serves to ensure a minimum refresh rate, e.g. a minimum refresh rate of 50 Hz. In some exemplary embodiments, when the maximum number of interacting lines is lower than the number of interacting lines identified, a selection process is made to select the best lines from the interacting lines identified. Optionally, the lines chosen are the lines with the most pronounced detection signal.

Exemplary Methods for Identifying Interacting Lines Based on Sampled Output

Typically, a presence of a touch interaction, e.g. finger touch or finger hover diminishes the amplitude of the coupled baseline signal that crosses at touch junctions 42 of interacting lines 3010. However, the reduction in signal amplitude is typically less pronounced when simultaneously triggering a plurality of sensor lines as compared to during scanning when only one line at a time is triggered. Typically, the presence of a finger decreases the amplitude of the coupled baseline signal 365 by 1%, or 1-5% during simultaneous triggering of all sensor lines along one axis as opposed to a decrease in amplitude of 5-15% or 15-30% while triggering one line. As such presence of a finger during simultaneous triggering of all lines along one of the axes is less pronounced as compared to the change when only a single line is triggered and the therefore the amplitude of the signal is less sensitive to a presence of touch. It is noted that the change in amplitude due to touch may vary for different scenarios, for example the change in amplitude is a function of the number of junctions of a sampled line that are touched and the number of lines simultaneously triggered.

According to some embodiments of the present invention, sensitivity is increased by dividing the sensor lines into two or more groups and triggering each of the groups in sequence. The sensitivity of the amplitude generally increases as the number of sensor lines triggered simultaneously decreases. According to some embodiments of the present invention, identification of interacting lines in the cross axis is provided in a plurality of steps and is completed after all the groups have been triggered.

According to some embodiments of the present invention, sensitivity is increased by dividing the sensor lines into two or more groups and simultaneously triggering each of the groups with different frequencies. In such embodiments, output signals can be decomposed into their different frequency components before analyzing amplitude levels for each of the frequencies used for triggering. In some exemplary embodiments, the different frequencies are orthogonal frequencies. Simultaneous triggering with different frequencies for interaction detection is described in more detail in incorporated US Patent Publication No. 20070062852.

In some exemplary embodiments, at least two groups are triggered simultaneously with a same frequency but with signals having a scalar product that is substantially zero, e.g. due to a 90 degree phase shift of the signal. In such embodiments, output signals can be decomposed into their various orthogonal components and amplitude levels of the decomposed signals can be analyzed to identify interacting lines. Simultaneous triggering with orthogonal signals having a same frequency is described in more detail in U.S. patent application Ser. No. 12/269,971 assigned to N-Trig Ltd. which is incorporated herein by reference. In some exemplary embodiments, one or more of sequential triggering of groups of lines, triggering different groups with different frequencies and triggering different groups with different orthogonal phases are combined to improve sensitivity of the signal amplitude output.

Although, incorporated U.S. Patent Publication 20070062852U.S and U.S. patent application Ser. No. 12/269,971 describe in some embodiments, using orthogonal signals and/or signals with different frequencies to simultaneously trigger lines for the purpose of increasing report rate, similar methods can be applied herein for increasing the sensitivity of the output signal to detect finger touch. The sensitivity is increased since the sum of the two components that correspond to each orthogonal frequency and/or phase is a vectorial sum, thus the output signal is less limited by the dynamic range of the receiver.

Exemplary Methods for Defining a Threshold to Identify an Interacting Line

In some exemplary embodiments, a pre-defined threshold, is used to identify an interacting line in response to simultaneous triggering of a plurality of lines on a cross axis. Typically, a larger threshold is used since the impact of the finger on the baseline signal is reduced.

In some exemplary embodiments, the threshold is defined as a factor times the average output signal sampled on the sensor in the absence of user interaction, e.g. a level that corresponds to 0.97-0.95 of average output signal sampled on the sensor. Optionally, the threshold is defined for the distance from output signal sampled on the sensor in the absence of user interaction.

In some exemplary embodiments, a current noise level of the system is detected and used to dynamically adjust a defined threshold for identifying interacting lines of the sensor. For example a threshold riding noise method may be implemented to adjust the threshold. In some exemplary embodiments, the threshold is defined dynamically as a factor, e.g. 0.97-0.95 times an output from a line having the highest amplitude output signal. Optionally, the threshold can be defined as a factor times an average output from of a pre-defined number of lines having the highest amplitude, e.g. from 10 lines. It is assumed that the lines used to define the threshold (the lines with the highest amplitude output signals) represent lines where no interaction is currently present.

Since the change in voltage is generally greater in the second step, in an embodiment of the invention, different thresholds are used for the first and second steps.

Exemplary Method for Calibrating Output Prior Identification of Interacting Lines In some exemplary embodiments, calibration may provide for compensating for different gain characteristics of individual lines and/or amplifiers at the end of sensor lines and/or for changes in gain in response to varying distances of different sampled lines from a point of triggering with respect to the point of triggering.

In some exemplary embodiments, a base level signal for each sensor line is measured in response to simultaneous triggering of lines in the cross axis and used to calibrate the outputs sampled from each line. Optionally, a baseline level for each line is saved in memory and output measured from each line during operation is reduced by its recorded baseline level prior to comparing the output to a threshold (for identifying interacting lines).

In some exemplary embodiments, during user interaction, a current noise level is additionally determined and removed from the output sampled. Optionally, a currently noise level is determined by identifying one or more lines where no interaction has taken place and using changes in the baseline level of those line(s) to define a current noise level for all the lines. In some exemplary embodiments, lines with no interaction are identified by first reducing all output to a level below a base line level, e.g. by subtracting the output by a pre-defined constant to ensure that current level are far below baseline level. Optionally a pre-defined number of lines having output closest to the baseline level are selected as lines where no interaction has taken place. An average of the noise level, e.g. change from baseline level, determined for these lines may be used as a noise estimation. The noise level is defined as the change from baseline determined from the selected lines.

Typically, baseline level for each line is defined in the manufacturing site while no interaction is present on the digitizer. Optionally, calibration is performed and/or updated during start up of the system or periodically during operation of the system, e.g. while a user is instructed not to interact with the screen. Typically, baseline levels are determined from an average of a plurality of sampled outputs, e.g. 50 samples.

It is noted that the methods described for defining a threshold and performing calibration can be performed on either one or both axes of the sensor by the methods described hereinabove. Typically, different thresholds and noise levels can be defined for each axis.

Figure 7A:
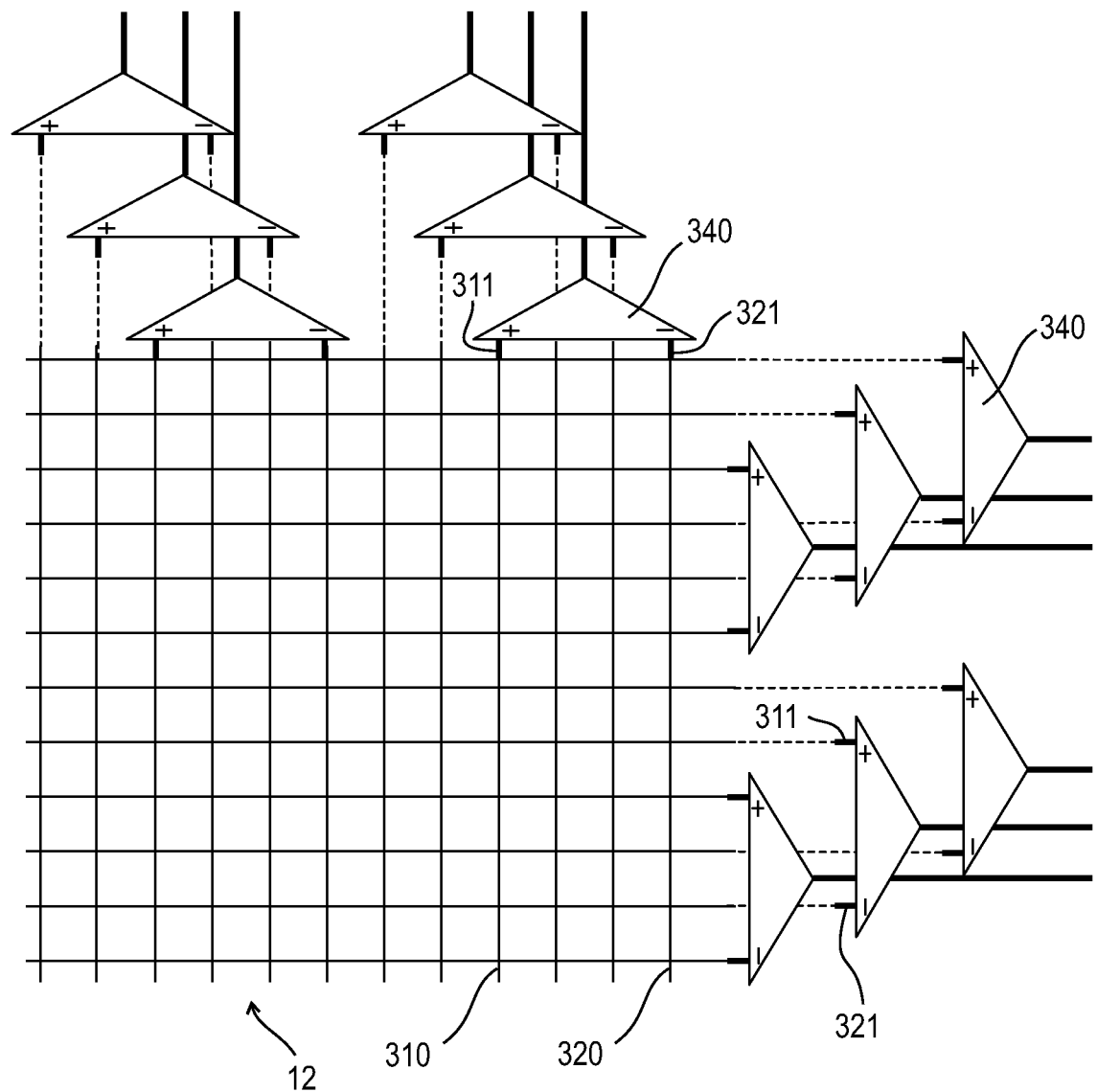
FIG. 7A is an exemplary simplified circuit diagram for touch detection based on differential signal outputs obtained from pairs of parallel sensor lines in a sensor grid for use with some embodiments of the present invention.
Figure 7B:
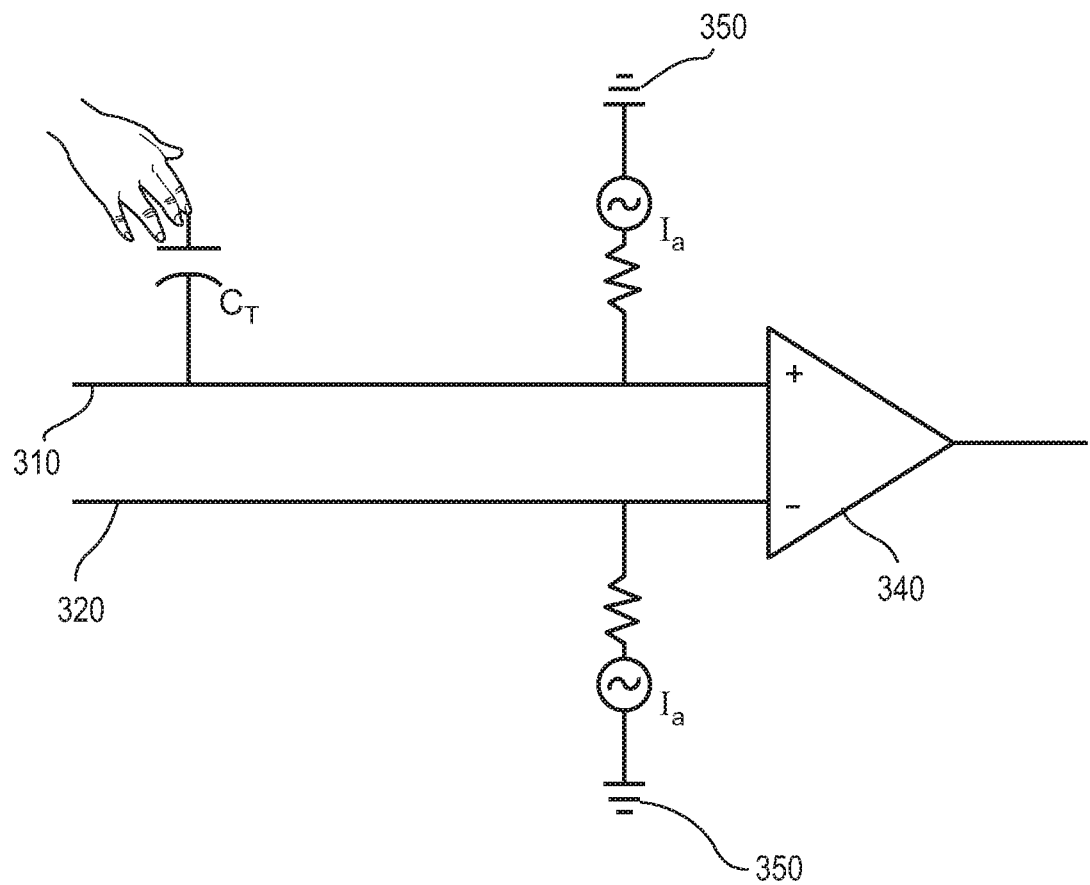
FIG. 7B is an exemplary simplified circuit diagram showing triggering of one pair of non-adjacent parallel sensor lines from the sensor for touch detection based on differential signal outputs for use with some embodiments of the present invention.

Interacting Lines Identified Based Analysis of Difference Signals Between Parallel Sensor Lines Reference is now made to FIG. 7A showing an exemplary simplified circuit diagram for touch detection based on differential signal outputs obtained from pairs of parallel sensor lines in a sensor grid and to FIG. 7B showing triggering of one pair of non-adjacent parallel sensor lines from the sensor grid shown in FIG. 7A for use with some embodiments of the present invention. According to some embodiments of the present invention, two parallel sensor lines, e.g. lines 310 and 320 that are close but not adjacent to one another are connected to a positive input 311 and negative input 321 of a differential amplifier 340. Amplifier 340 is thus able to generate an output signal which is an amplification of the difference between the two sensor line signals. Typically output is detected on sensor lines in both the X and Y direction. In some exemplary embodiments, a single input amplifier is implemented and difference signal is determined by software embedded in digital unit 20.

According to some embodiments of the present invention, sensor lines 310 and 320 are interrogated to determine if there is a finger input signal derived from finger touch and/or finger hovering. To query the pair of sensor lines, a signal source Ia, e.g. an AC signal source induces an oscillating signal in the pair. Signals are referenced to a common ground 350. When a finger is placed on one of the sensor lines of the pair, a capacitance, CT, develops between the finger (either touching or hovering over the digitizer) and sensor line 310. As there is a potential between the sensor line 310 and the user's finger, current passes from the sensor line 310 through the finger to ground. Consequently a potential difference is created between sensor line 310 and its pair 320, both of which serve as input to differential input terminals of differential amplifier 340.

Separation between the two sensor lines 310 and 320 is typically greater than the width of the finger so that the necessary potential difference can be formed, e.g. approximately 12 mm. Typically, the finger hovers over and/or touches the digitizer over a number of sensor lines so as to generate an output signal in more than one differential amplifier, e.g. a plurality of differential amplifier's. ASIC 16 and digital unit 20 process the amplified signal and determine the location and/or position of the user's finger based on the amplitude and/or signal level of the sensed signal. Although only one pair of sensor lines are shown in FIG. 7B, it is noted that typically touch is typically detected based on a plurality of outputs from differential amplifiers with input obtained from interleaving sensor lines.

In one example, the origin of the user's finger from the two inputs of the differential amplifier is determined by examining the phase of the output. In another example, since a finger touch typically produces output in more than one sensor line, the origin of the user's finger from the two inputs of the differential amplifier is determined by examining outputs of neighboring amplifiers and optionally interpolating is used to find a more accurate value. In yet other examples, a combination of both methods may be implemented.

Ambiguity as to the location of each finger may arise in some finger positions when a user concurrently places two or more fingers on or over sensor 12. As such a plurality of concurrent interactions cannot always be detected without ambiguity using such a touch detection method.

According to some embodiments of the present invention, this method of touch detection which is referred to as a single touch detection method is described with further details in, for example incorporated U.S. Pat. No. 7,372,455. The present invention is not limited to the technical description of the digitizer system described herein. The present invention may also be applicable to other digitized sensor and touch screens known in the art, depending on their construction. The present invention may also be applicable to other touch detection methods known in the art.

It is noted the method described in FIGS. 7A and 7B is an exemplary method of single touch detection that provides for identifying sensor lines of a grid based sensor that are affected by touch and that other methods for single touch detection and/or methods identifying sensor lines affected by touch can also be applied. Typically, single touch detection methods provide for obtaining a one dimensional information regarding interaction on a sensor. It is noted that other methods for providing one dimensional information regarding interaction on a sensor can be applied for detection, e.g. identification of the interacting lines, during the first stage of detection.

Reference is now made to FIGS. 8A-8B showing two scenarios of output from a digitizer sensor based on differential signal outputs while two fingers are concurrently interacting with the sensor in accordance with some embodiments of the present invention. As described above ambiguity as to the location of each finger may arise in some finger positions when a user concurrently places two fingers on or over sensor 12 so that a plurality of concurrent interactions cannot always be deciphered.

A scenario shown in FIG. 8A is an example of a scenario when two interaction locations can be determined without ambiguity using output from difference signals. In a scenario when it is known that no more than two interactions are concurrently interacting with the digitizer, positions of fingers 901 can be unambiguously determined from outputs 903 on one axis and outputs 904 on the other axis. In scenario both interaction locations are positioned on (or over) common sensor lines in the horizontal axis. Similarly, if there is pre-knowledge that are a defined number of interactions concurrently interacting with the digitizer and all the interaction locations are spread over common sensor lines along one axis, there positions can be unambiguously determined.

However, in other scenarios, where the number of interactions concurrently interacting with sensor 12 is not known and/or when the interaction locations are not positioned over common sensor lines, locations of the interactions may be ambiguous for a plurality of concurrent interactions. A scenario shown in FIG. 8B demonstrates this case. For example based on outputs 906 along one axis and outputs 908 along an orthogonal axis, locations of interactions 902 are ambiguous. Based on the output, the interactions can either be positioned in locations 902 or alternatively in locations 902'. Additionally, if there is no pre-knowledge of the number of concurrent interactions, it is possible to derive from the output that interaction exists in positions 902 and 902'.

According to some embodiments of the present invention, the lines determined to include interaction are identified as interacting lines and are scanned to resolve the ambiguity.

Typically, scanning is based on known methods for multi-touch detection as described herein above. According to some embodiments of the present invention, sensor lines determined to be associated with interaction based on the differential outputs signals are defined as interacting lines and are scanned to determine positions of the interactions on those lines, e.g. resolve ambiguity of interaction locations. To scan the interacting lines using known multi-touch methods, output from the lines are connected to single ended amplifiers. In some exemplary embodiments, each of the lines are input to both a single ended amplifier and a differential amplifier and output is sampled from the relevant amplifier depending on the detection method used. Optionally, during scanning one of the inputs to the differential amplifiers are grounded to scan a first portion of the lines and subsequently the other input to the differential amplifiers are grounded to scan the rest of the lines as required. Typically, grounding is controlled by digital unit 20 and/or ASIC 16.

According to some exemplary embodiments, scanning is used to resolve ambiguity and then as long as the following outputs only differ from previous outputs by a small amount or in a manner that signifies that previous interaction points are maintained on the sensor the ambiguity can be resolved based on tracking based on previously determined positions so that there is no need to continue scanning for each refresh period, e.g. sampling cycle. For example, in cases when the output obtained from difference signals is the same and/or close to outputs obtained in previous samples cycles, e.g. refresh periods, scanning is performed over one cycle (or more than one cycle) and positions of the interaction in subsequent cycles is determined without scanning using knowledge of the interactions in previous cycles, e.g. the second stage of detection is skipped.

In some exemplary embodiments, during gesture recognition, scanning may be implemented at pre-define intervals while the gesture is being performed to determine positions, e.g. initial positions, of interactions to provide for recognizing the gesture. For example, scanning can be used to differentiate between a rotate clockwise gesture and a rotate counter-clockwise gesture performed by two fingers tracing part of a circle that is otherwise identified based on differential output signals. Examples of multi-touch gestures recognized based on differential output signals of parallel sensor lines is described in U.S. patent application Ser. No. 12/265,819 filed on Nov. 6, 2008 assigned to N-Trig Ltd and which is hereby incorporated by reference. In U.S. patent application Ser. No. 12/265,819 such a rotate clockwise gesture and a rotate counter-clockwise gesture is described in further detail.

According to some embodiments of the present invention, when only a portion of sensor 12 is defined for multi-touch interaction, the second stage of detection is performed only when two or more interaction areas are found in the portion of the sensor defined from multi-touch.

It is noted that some of the differential amplifiers 340 may produce a null value where in cases when an interaction is present over each of the lines serving as input to the differential amplifier. This may be due to a single interaction location, e.g. a particularly wide finger touch and/or due to a plurality of concurrent interaction. These null values may at times make it difficult to identify all interaction locations and/or all interacting lines. Since finger touches typically spread over more than one line such the interaction may be identified by other neighboring lines. According to some embodiments of the present invention, if there is a pre-defined number of lines showing no interaction, e.g. due to unintentional null value, between lines showing interaction, those lines are included as interacting lines and scanned to determine interaction position.

Reference is now made to FIG. 9 showing a simplified flow chart describing an exemplary method for identifying and scanning selected portions of a digitizer sensor based on signal outputs obtained for both axes simultaneously to determine multi-touch interaction in accordance with some embodiments of the present invention. According to some embodiments of the present invention, during a first stage of detection all sensor lines, e.g. all sensor lines on both axes are interrogated (block 910) simultaneously and output from the lines are obtained (block 920). Optionally, differential output signals of parallel lines are obtained. Based on the output, interacting lines (lines including interaction) on both axes are identified (block 930). Exemplary methods for identifying of interacting lines based on the output from the differential amplifiers is similar to the methods described herein above and in incorporated U.S. Pat. No. 7,372,455 for determining lines including interaction. A query is made to determine if scanning is required (block 940). In some exemplary embodiments, if no interaction is identified or if only a single interaction location is determined, scanning is not executed and the determined location from outputs sampled during a first stage of detection is reported (block 970). In some exemplary embodiments, when multi-touch positions can be resolved without scanning as described above scanning is not performed and locations of the interactions are based on outputs from the first stage of detection and/or based on previously determined positions of the interactions.

According to some embodiments of the present invention, if scanning is determined to be required, e.g. the interaction position(s) cannot be unambiguously determined based on output signals obtained during a first stage of detection, a portion of the sensor for scanning is defined based on the interacting lines identified (block 950). In some exemplary embodiments, the defined portion includes all the interacting lines plus a pre-defined number of neighboring lines between interacting lines and/or on either side of the interacting lines. Optionally, an area defined by the two most peripheral interacting lines in each axis is defined as the portion to be scanned. Based on the selection, the portion is scanned (block 960) and the interaction locations within the portion are identified (block 970). Scanning may be performed by the methods described in reference to block 640, block 645 and block 650 (FIG. 6). Typically, the methods described in reference to FIG. 9 are repeated during each sampling cycle, so that at a first stage of detection, interaction is detected based on a first method of detection (providing for fast detection) and if interaction locations cannot be unambiguously deciphered based on the first method of detection during the same sampling cycle (at a second subsequent stage of the cycle) interaction is detected based on a second method of detection in a selected portion of the sensor identified from the first detection method. In such a manner the number of lines that require scanning to determine interaction positions is reduced.

It is noted that stylus interaction can be detected concurrently with finger touch using the detection methods described hereinabove. Typically, the stylus is triggered at a frequency other than the frequency used for finger detection so that finger and stylus detection can be differentiated.

It is noted that typically, interrogation and/or triggering of the sensor lines, and selection of the interacting lines and/or portions to be scanned and sampling of the output of the lines is controlled by digital unit 20 together with ASIC 16.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

While several exemplary embodiments of the invention have been described in detail above, those skilled in the art will recognize other embodiments and variations which come within the scope of the invention. It is accordingly understood that the scope of the invention is not intended to be limited by the written description herein, but rather is to be given the full scope permitted by the following claims.

What is claimed is:

1. A method for operating a device, the method comprising:
   operating a sensor including sensor lines arranged along a first axis and along a second axis to form a grid; and
   prior to scanning any of the sensor lines, identifying user interactions on the sensor;
   based at least on identifying the user interactions:
      sampling, by a circuit in communication with the sensor, first outputs of the sensor responsive to simultaneously triggering the sensor lines along the first axis with a same signal over a first stage of detection without sampling the sensor lines along the second axis; and
      selecting, by the circuit, a second set of the sensor lines along the second axis that indicate a presence of the user interactions based on the first outputs sampled;
      triggering, by the circuit, based on a multi-touch detection method, only the second set of the sensor lines over a second stage of detection to receive second outputs; and
      determining, by the circuit, positions of the user interactions on the sensor from the second outputs.

2. The method according to claim 1, wherein scanning comprises independently triggering each line of the second set of the sensor lines; and
   wherein determining positions of the user interactions comprises:
      determining the first outputs on at least one line crossing a triggered line; and
      determining a position of the user interactions based on the first outputs.

3. The method according to claim 2, wherein the sampling of the first outputs and the triggering of only the second set are performed over a single refresh cycle of the sensor.

4. The method according to claim 1, wherein the sampling of the first outputs takes less time than the triggering only the second set.

5. The method according to claim 1, wherein the second set is only along the first axis, and the second set is triggered based on the first axis being selected as a triggering axis, and only sensor lines on the triggering axis are scanned.

6. The method according to claim 5, wherein the first outputs sampled are sampled simultaneously.

7. The method according to claim 1, wherein the first outputs sampled are difference signals between pairs of sensor lines of the sensor.

8. A device comprising:
   a sensor comprising sensor lines arranged along a first axis and along a second axis to form a grid; and
   a processor programmed to perform following operations:
      prior to scanning any of the sensor lines, identifying user interactions on the sensor;
      based at least on identifying the user interactions:
         sample first outputs of the sensor responsive to simultaneously trigger the sensor lines along the first axis with a same signal over a first stage of detection without sampling the sensor lines along the second axis; and
         select a second set of the sensor lines along the second axis that indicate a presence of user interactions from based on the first outputs sampled;
      trigger, based on a multi-touch detection, only the second set of sensor lines, one sensor line at a time over a second stage to receive second outputs;
      sample second outputs responsive to the triggering over the second stage; and
      determine positions of the user interactions on the sensor from the second outputs sampled over the second stage, wherein the first stage occurs over a first period of time and wherein the second stage occurs over a second period of time subsequent to the first period of time.

9. The device according to claim 8, wherein triggering comprises independently triggering each line of the second set of the sensor lines; and
   wherein determining positions of the user comprises:
      determining outputs on at least one line crossing a triggered line; and
      determining a position of the user interaction based on the outputs.

10. The device according to claim 8, wherein the sampling of the first outputs and the triggering of only the second set are performed over a single refresh cycle of the sensor.

11. The device according to claim 8, wherein the sampling of the first outputs takes less time than the triggering only the second set.

12. The device according to claim 8, wherein the second set is only along the first axis, and the second set is scanned based on the first axis being selected as a triggering axis, and only sensor lines on the triggering axis are scanned.

13. The device according to claim 8, wherein the first outputs sampled are sampled simultaneously.

14. The device according to claim 8, wherein the first outputs sampled are difference signals between pairs of sensor lines of the sensor.

15. A device comprising:
   a sensor comprising sensor lines arranged along a first axis and along a second axis to form a grid; and
   a circuit in communication with the sensor, the circuit configured to:

prior to scanning any of the sensor lines, identifying user interactions on the sensor;

based at least on identifying the user interactions:
- sample first outputs of the sensor responsive to simultaneously triggering the sensor lines along the first axis with a same signal over a first stage of detection without sampling the sensor lines along the second axis; and
- select a second set of the sensor lines along the second axis that indicate a presence of the user interactions from based on the first outputs sampled;

trigger, based on a multi-touch detection, only the second set, one sensor line at a time over a second stage to receive second outputs;

sample second outputs responsive to the triggering over the second stage; and determine positions of the user interactions on the sensor from the second outputs sampled over the second stage, wherein the first stage occurs over a first period of time and wherein the second stage occurs over a second period of time subsequent to the first period of time.

16. The device according to claim 15, wherein triggering comprises independently triggering each line of the second set of the sensor lines; and wherein determining positions of the user comprises:
- determining outputs on at least one line crossing a triggered line; and
- determining a position of the user interaction based on the outputs.

17. The device according to claim 15, wherein the sampling of the first outputs and the triggering of only the second set are performed over a single refresh cycle of the sensor.

18. The device according to claim 15, wherein the sampling of the first outputs takes less time than the triggering only the second set.

19. The device according to claim 15, wherein the second set is only along the first axis, and the second set is triggered based on the first axis being selected as a triggering axis, and only sensor lines on the triggering axis are scanned.

20. The device according to claim 15, wherein the first outputs sampled are sampled simultaneously.

* * * * *